US008863073B2

(12) United States Patent
Chaar et al.

(10) Patent No.: US 8,863,073 B2
(45) Date of Patent: *Oct. 14, 2014

(54) SOFTWARE FACTORY HEALTH MONITORING

(71) Applicant: International Business Machines Corporation, Armonk, NY (US)

(72) Inventors: Jarir K. Chaar, Tarrytown, NY (US); Ronald D. Finlayson, Blythewood, SC (US); Thomas A. Jobson, Jr., New Paltz, NY (US); Naomi M. Mitsumori, Richmond, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/680,285

(22) Filed: Nov. 19, 2012

(65) Prior Publication Data
US 2013/0080992 A1  Mar. 28, 2013

Related U.S. Application Data

(63) Continuation of application No. 11/735,099, filed on Apr. 13, 2007, now Pat. No. 8,327,318.

(51) Int. Cl.
*G06F 9/44* (2006.01)
*G06Q 10/06* (2012.01)

(52) U.S. Cl.
CPC ...... *G06F 8/10* (2013.01); *G06Q 10/06* (2013.01); *G06F 8/36* (2013.01); *G06F 8/71* (2013.01)
USPC .......... 717/102; 717/101; 717/120; 717/121; 717/122; 717/123

(58) Field of Classification Search
None
See application file for complete search history.

(56) References Cited

U.S. PATENT DOCUMENTS 7,774,791 B1 * 8/2010 Appelbaum et al. .......... 719/318
2006/0036455 A1 * 2/2006 Prasad et al. ..................... 705/1
2008/0163164 A1 * 7/2008 Chowdhary et al. .......... 717/106

OTHER PUBLICATIONS

Kramer, "IBM WebSphere Portlet Factory 5.11.3 Portlet Development through Component Assembly and Mass Customization," Patricia Seybold Group, Mar. 7, 2006.*
IBM, "IBM® Workplace™ for Business Strategy Execution solutions," Solutions to better manage and execute business strategy Executive brief, Nov. 2005.*

* cited by examiner

*Primary Examiner* — Insun Kang
(74) *Attorney, Agent, or Firm* — Yudell Isidore Ng Russell PLLC; John Pivnichny

(57) ABSTRACT

A method, system, and computer-readable medium for maintaining a health of a software factory that creates custom software in a standardized manner is presented. In a preferred embodiment, the method includes the steps of: defining work packets to perform sub-functions of a custom software; tracking a transmission of the work packets to an assembly line in a software factory; monitoring any retrieval of software artifacts that are used to create the work packets; monitoring any on-going changes of work activities that are contained in the work packets; determining if execution of the work packets conforms to governance guidelines for the software factory; monitoring the software factory to ensure that the work packets comply with an architecture of the software factory; tracking quality metrics for an execution of the work packets in an assembly line in the software factory; and transmitting all tracked and monitored information to a dashboard.

21 Claims, 23 Drawing Sheets

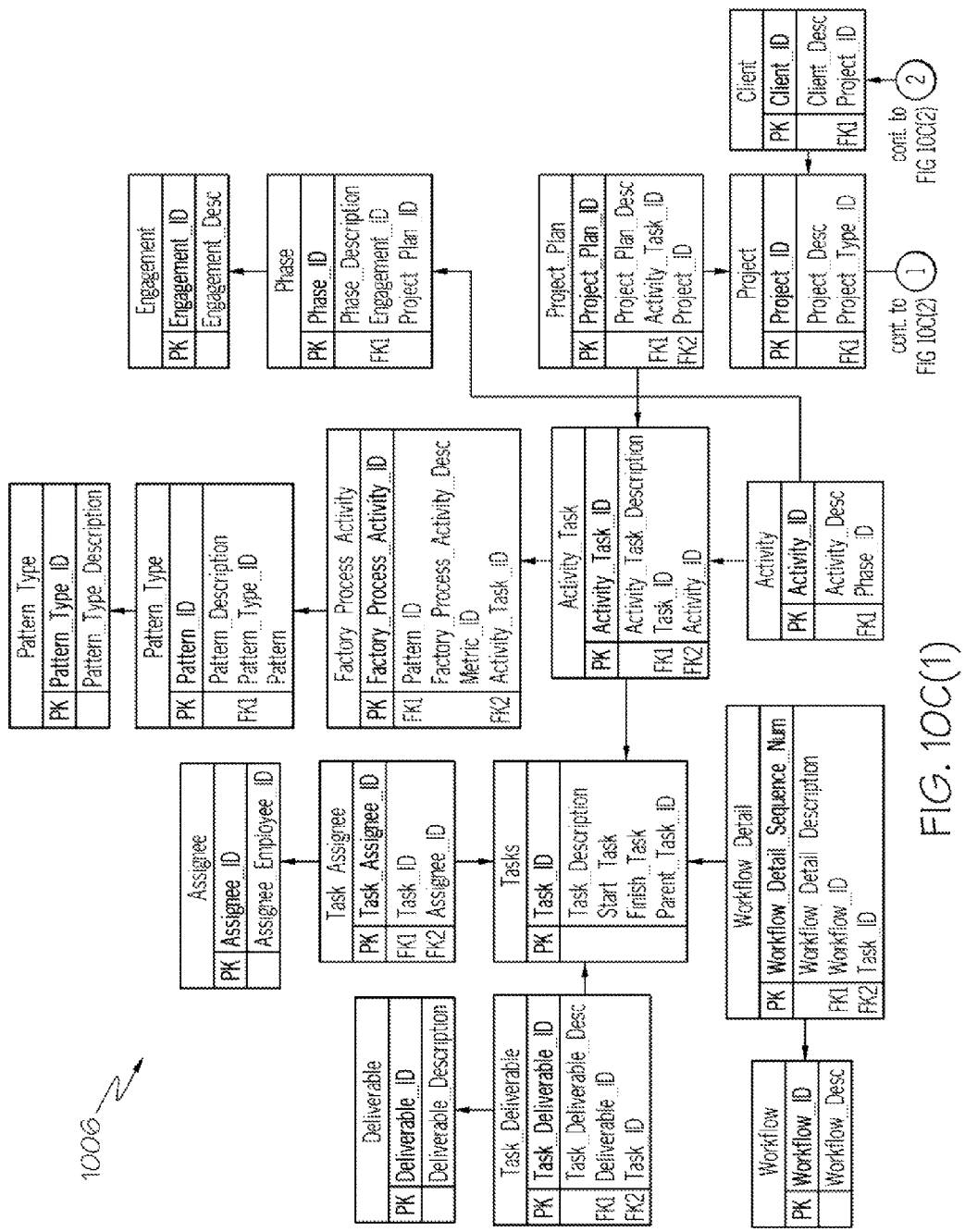
FIG. 10C(1)

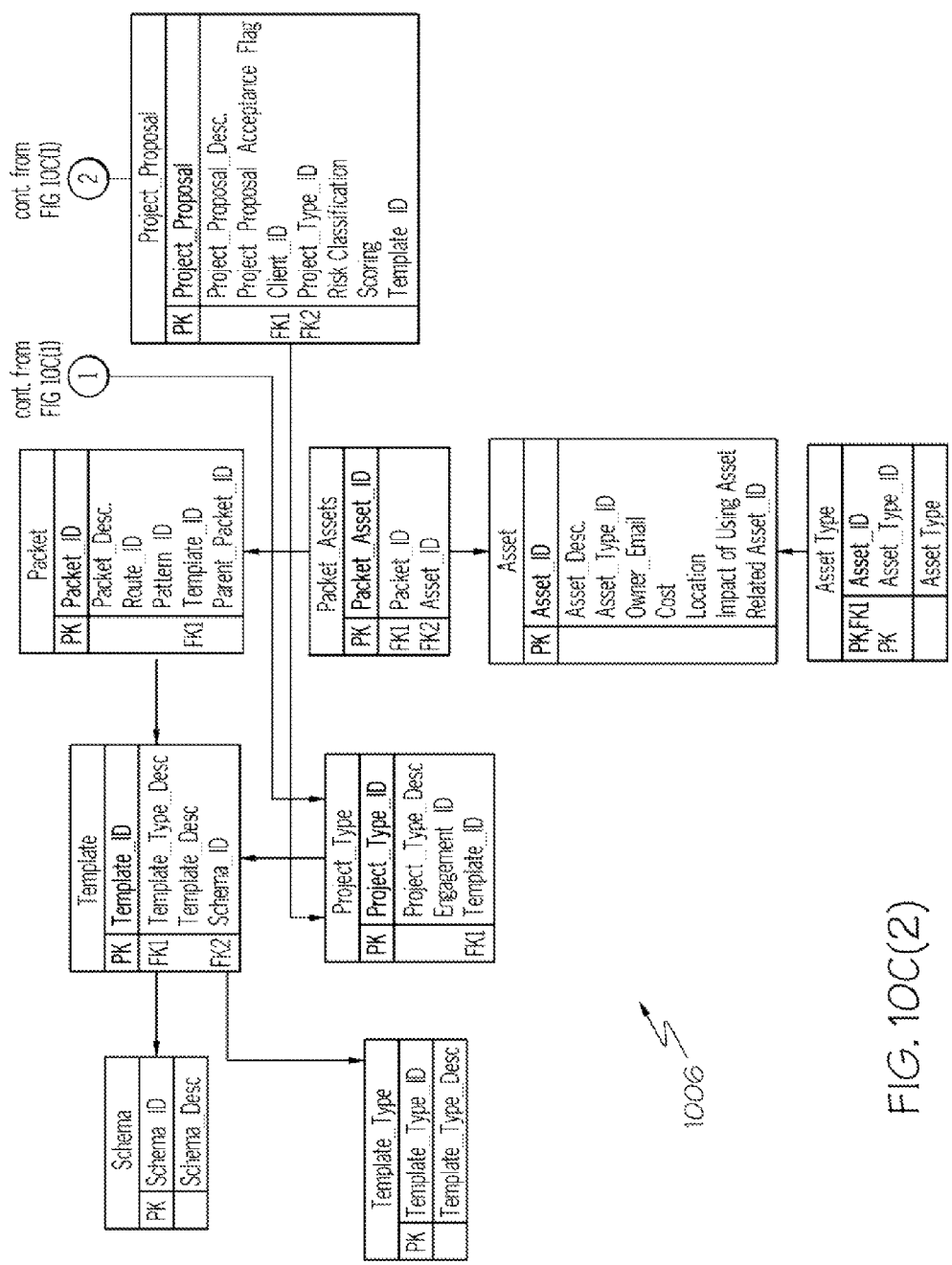
FIG. 10C(2)

SOFTWARE FACTORY HEALTH MONITORING

PRIORITY CLAIM

The present application is a continuation of and claims priority from U.S. Pat. No. 8,327,318 (patent application Ser. No. 11/735,099), filed on Apr. 13, 2007 titled "Software Factory Health Monitoring," which is incorporated by reference herein in its entirety and for all purposes.

BACKGROUND OF THE INVENTION

1. Technical Field

The present disclosure relates in general to the field of computers, and more particularly to the use of computer software. Still more particularly, the present disclosure relates to the creation of semi-custom software through the use of a standardized software factory.

2. Description of the Related Art

Software can be classified as being in one of two main categories: "off-the-shelf" and "custom." As the name implies, off-the-shelf software is pre-developed software that has little, if any flexibility. Thus, the customer must tailor her activities to conform to the software. While such software is initially inexpensive compared to custom software, long-term costs (in time and money for software implementation, training, business process alterations, etc.) can be onerous in an enterprise environment. Custom software, as the name implies, is custom built software that is tailored to existing or planned activities of the customer.

Today, software development, and particularly custom software development, is perceived as more of an art than a science. This is particularly true for custom software that is being created by a third-party for an enterprise customer. That is, a developer must rely on her experience, training, intuition, and communication skills to create software that is both unique and reliable. This often leads to software of varying degrees of reliability, usefulness and value to the customer.

SUMMARY OF THE INVENTION

To address the issues described above, the present disclosure provides a computer-implemented method, system, and computer-readable medium for maintaining a health of a software factory that creates custom software in a standardized manner. In a preferred embodiment, the computer-implemented method includes: defining work packets to perform sub-functions of a custom software, where the work packet is a pre-stored, reusable, self-contained, discrete unit of software code; tracking a transmission of the work packets to an assembly line in a software factory; monitoring any retrieval of software artifacts that are used to create the work packets; monitoring any on-going changes of work activities that are contained in the work packets; determining if execution of the work packets conforms to governance guidelines for the software factory; monitoring the software factory to ensure that the work packets comply with an architecture of the software factory; tracking quality metrics for an execution of the work packets in an assembly line in the software factory; and transmitting all tracked and monitored information described above to a dashboard in a monitoring display to depict a real-time health condition of the software factory.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 10b-e depict a relationship between different software objects used to dynamically generate and manage checklists for creating a deliverable, a Software Factory Packet Pattern Analysis, and Predictive Forecasting Model that is used to dynamically generate checklists used to aid in the creation of work packets in the software factory;

DETAILED DESCRIPTION OF THE PREFERRED EMBODIMENT

Presented herein is a software factory, which includes a collection of business and Information Technology (IT) governance models, operational models, delivery methods, metrics, environment and tools bundled together to improve the quality of delivered software systems, control cost overruns, and effect timely delivery of such systems. The software factory described herein offers a practical solution to developing software systems using multiple sites that are geographically distributed. The issues of varying timezones and the hand-over between various teams residing in such timezones are handled by exchanging work packets. A work packet is a self-contained work unit that is composed of processes, roles, activities, applications and the necessary input parameters that allow a team to conduct a development activity in a formalized manner with visibility to progress of their effort afforded to the requesting teams.

The novel software factory described herein is a uniquely engineered scalable efficiency model construct that transforms a traditional software development art form into a repeatable scientific managed engineered streamline information supply chain. The software factory incorporates applied system and industrial engineering quality assured efficiencies that provide for the waste eliminating, highly optimized performed instrumentation, measured monitoring and risk mitigated management of software development.

Software Factory Overview

Figure 1:
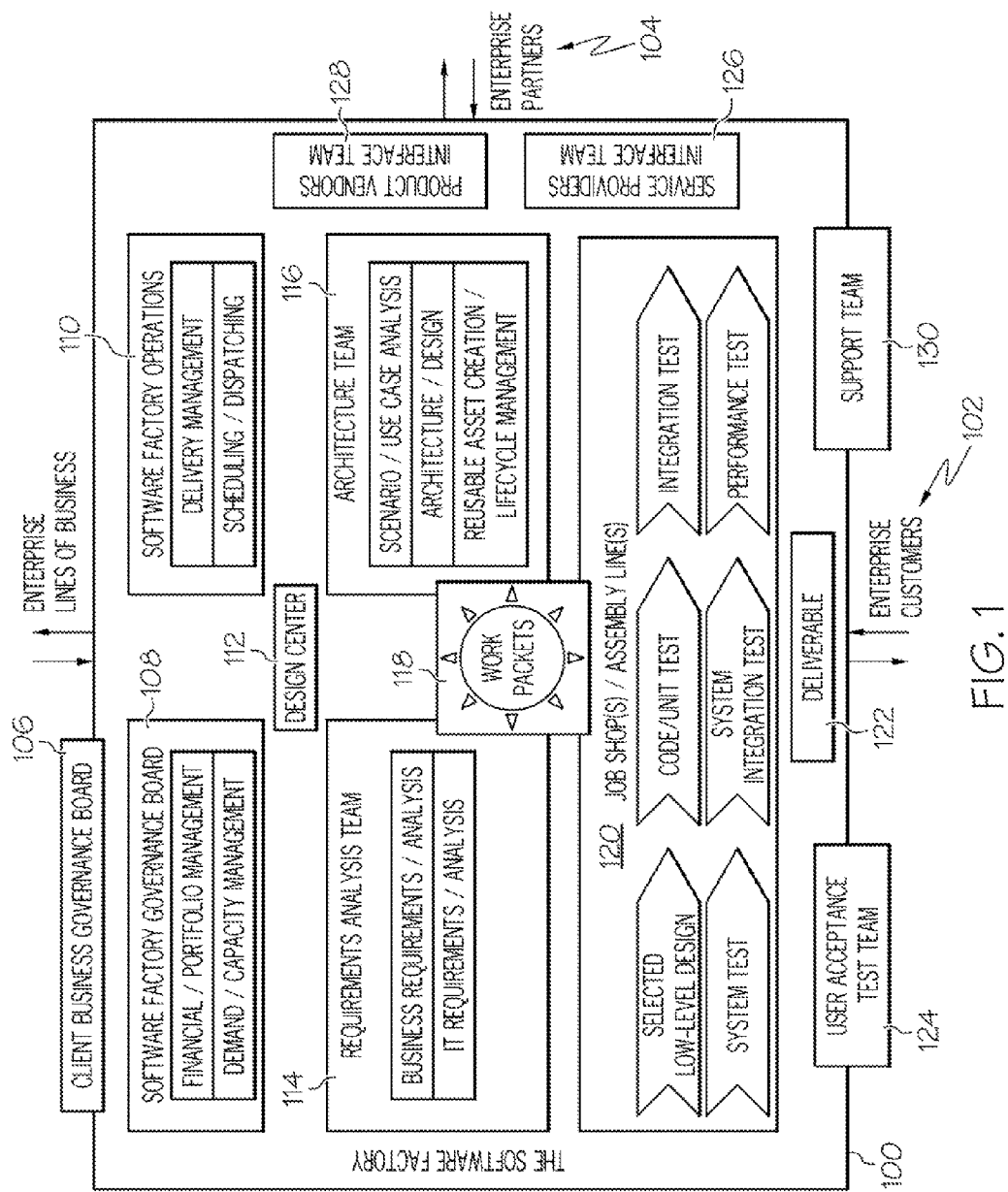
FIG. 1 is an overview of a novel software factory.

With reference now to the figures, and in particular to FIG. 1, an overview of a preferred embodiment of a software factory 100 is presented. As depicted, the software factory 100 is a service that interacts with both enterprise customers (i.e., client customers) 102 as well as enterprise partners (i.e., third party vendors) 104. The primary human interface with the enterprise customers 102 is through a Client Business Governance Board (CBGB) 106. CBGB 106 represents client stakeholders and client business sponsors that fund a project of the software factory 100. CBGB 106 can be an internal or external client. That is, the same enterprise (i.e., internal client) may include both CBGB 106 and software factory 100, or a first enterprise (i.e., external client) may have CBGB 106 while a second enterprise has the software factory 100. As described in greater detail below, a project proposal definition is then run through a software factory induction process in a Software Factory Governance Board (SFGB) 108 and Software Factory Operations (SFO) 110, where the project proposal definition is evaluated, qualified, scored and categorized. The project proposal definition is then subject to a System Engineering Conceptual Requirements Review by the SFGB 108. Based on the outcome of the review by the SFGB 108, a decision is made to accept the project proposal definition or to send it back to the CBGB 106 for remediation and resubmission through the Software Factory Induction Process.

Thus, Software Factory Governance, which includes SFGB 108 and SFO 110, provides the guidance, constraints, and underlying enforcement of all the factory policies and procedures, in support of their governing principles in support of the strategic objects of the Software Factory 100. Software Factory governance consists of factory business, IT and operations governance. The principles, policies and procedures of these models are carried out by two governing bodies—the Business Governance Board and the IT Governance Board (both part of SFGB 108), and an enforcement body—the Software Factory Operations 110.

Thus, Software Factory Governance is responsible for:
Business and IT strategic planning;
Assuring that Business and IT strategies are aligned;
Setting Goals;
Monitoring those goals;
Detecting problems in Achieving those goals;
Analyzing Problems;
Identifying Reasons;
Taking Action;
Providing Feedback; and
Re-Strategizing (Continue process improvement).

As soon as a project is deemed worthy to proceed, the job of creating the custom software is sent to a Design Center 112, where the project is broken into major functional areas, including those handled by a Requirements Analysis Team 114 and an Architectural Team 116.

The Requirements Analysis Team 114 handles the Requirement Management side of the Design Center 112, and is responsible for collecting the business requirements from the lines of business and populating these requirements into the tools. Analysis of business requirements is also carried out in order to derive associated IT requirements. Some requirements (e.g. system requirements) may have a contractual constraint to use a certain infrastructure. Requirements are analyzed and used in the bases for business modeling. These requirements and representative business (contextual, event and process models) are then verified with and signed off from project stakeholders. Requirements are then base-lined and managed within release and version control.

The Architectural Side of the Design Center 112 is handled by the Architecture Team 116, which takes the output of the requirement/analysis/management side of the design center, and uses architectural decision factors (functional requirements, non-functional requirements, available technology, and constraints), to model a design with appropriate example representation into detail design specification, that is bundled with other pertinent factors into a work packet for assembly lines to execute.

Work Packets 118 are reusable, self-contained, discrete units of software code that constitute a contractual agreement that governs the relationship among Design Center 112, Software Factory Governance Board 108, Software Factory Operations 110, and Assembly Line 120. That is, each work packet 118 includes governance policies and procedures (e.g., including instructions for how work reports are generated and communicated to the client), standards (e.g., protocol for the work packet 118), reused assets (e.g., reusable blocks of code, including the requirements, instructions and/or links/pointers associated with those reusable blocks of code), work packet instructions (e.g., instructions for executing the work packet 118), integration strategy (e.g., how to integrate the work packet 118 into a client's security system), schedule (e.g., when deliverables are delivered to the client), exit criteria (e.g., a checklist for returning the work packet 118 and/or deliverables to the software factory 100), and Input/Output (I/O) work products (e.g., artifact checklist templates for I/O routines).

Assembly Line(s) 120 (Job Shop(s); Execution Units) receive and execute the work packets 118, which are specified by the Design Center 112, to create a customized deliverable 122. As shown in exemplary manner, the assembly line 120 puts the work packets 118 into a selected low-level design to generate a deliverable (executable product). While assembly line 120 can be a manual operation in which a coding person assembles and tests work packets, in another embodiment this process is automated using software that recognizes project types, and automatically assembles work packets needed for a recognized project type.

Various tests can be performed in the assembly line 120, including code/unit tests, integration test, system test, system integration test, and performance test. "Code/unit test" tests the deliverable for stand-alone bugs. "Integration test" tests the deliverable for compatibility with the client's system. "System test" checks the client's system to ensure that it is operating properly. "System integration test" tests for bugs that may arise when the deliverable is integrated into the client's system. "Performance test" tests the deliverable as it is executing in the client's system. Note that if the deliverable is being executed on a service provider's system, then all tests described are obviously performed on the service provider's system rather than the client's system.

A User Acceptance Test Team 124 includes a client stakeholder that is charged with the responsibility of approving acceptance of deliverable 122.

Software factory 100 may utilize enterprise partners 104 to provide human, hardware or software support in the generation, delivery and/or support of deliverables 122. Such third party contractors are viewed as a resource extension of the software factory 100, and are governed under the same guidelines described above.

If an enterprise partner 104 is involved in the generation of work packets 118 and/or deliverables 122, an interface between the software factory 100 and the enterprise partner 104 may be provided by a service provider's interface team 126 and/or a product vendor's interface team 128. Service provided by an enterprise partner 104 may be a constraint that is part of contractual agreement with a client to provide specialized services. An example of such a constraint is a required integrated information service component that is referenced in the integration design portion of the work packet 118 that is sent to assemble line 120. Again, note that third party service providers use a standard integration strategy that is defined by the software factory 100, and, as such, are subject to and obligated to operate under software factory governance.

Product vendor's interface team 128 provides an interface with a Product Vendor, which is an enterprise partner 104 that provides software factory 100 with supported products that maybe used within a software factory solution. Product Vendors are also responsible for providing product support and maintaining vendor's relationships, which are managed under the software factory's governance guidelines.

Support Team 130 includes both Level 2 (L2) support and Level 1 (L1) support.

L2 Support is provided primarily by Software Engineers, who provide problem support of Software Factory produced delivered code for customers. That is, if a deliverable 122 doesn't run as designed, then the software engineers will troubleshoot the problem until it is fixed. These software engineers deliver technical assistance to Software Factory customers with information, tools, and fixes to prevent known software (and possibly hardware) problems, and provide timely responses to customer inquiries and resolutions to customer problems.

L1 support is primarily provided by an L1 Help Desk (Call Center). L1 Help Desk support can be done via self-service voice recognition and voice response, or by text chat to an automated smart attendant, or a call can be directed to a Customer Service Representative (CSR). Customer Service Representatives in this role provide first line of help problem support of Software Factory produced deliverables. Such help includes user instruction of known factory solution procedures. For any related customers issues that can not be resolved through L1, the L1 Help Desk will provide preliminary problem identification, create trouble ticket entry into trouble tracking system, which then triggers a workflow event to dynamically route the problem issue to available and an appropriate L2 support group queue.

Figure 2:
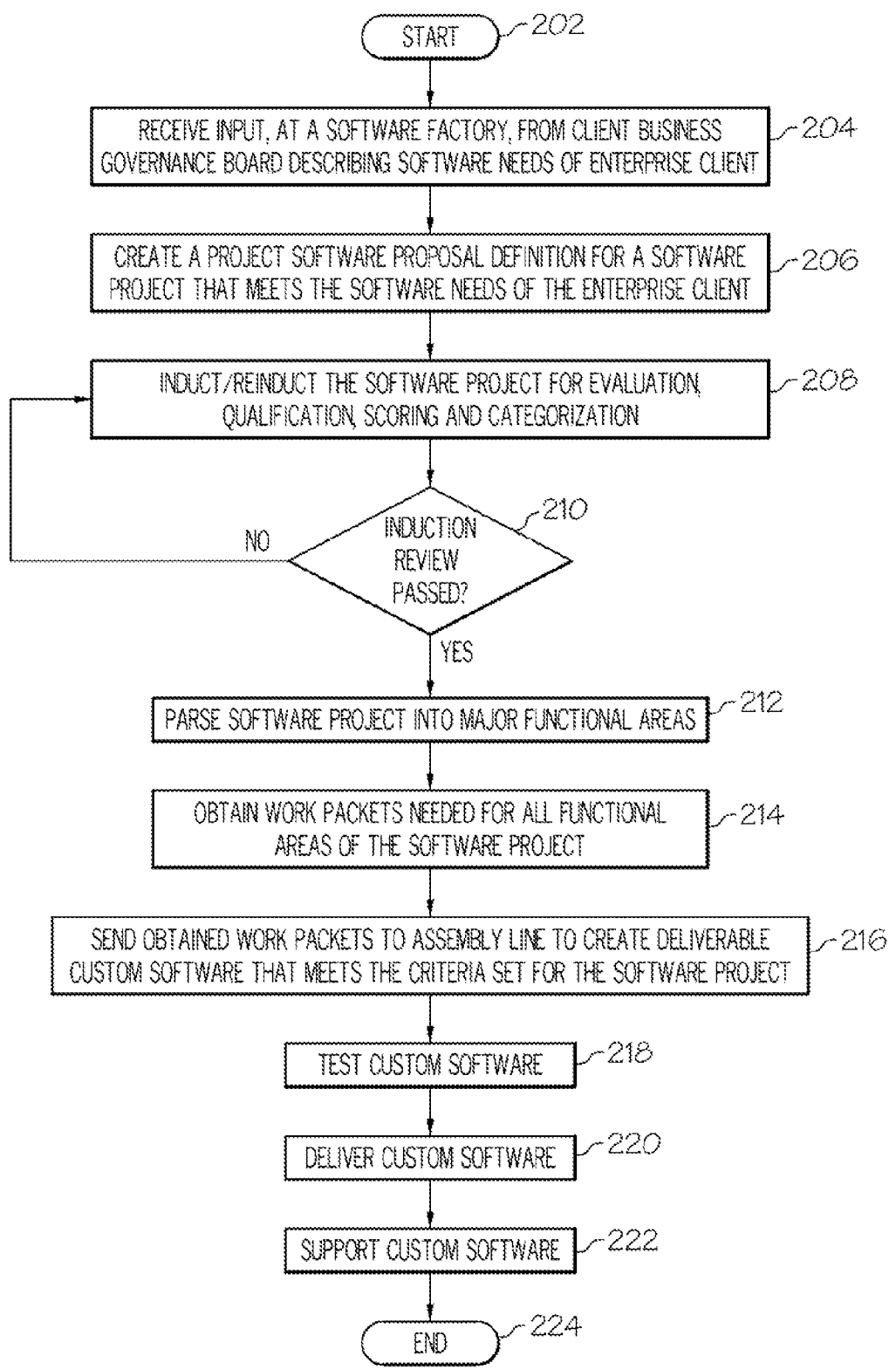
FIG. 2 is a flow-chart of steps taken to create custom software through the use of work packets in a software factory.

With reference now to FIG. 2, a flow-chart of exemplary steps taken to create custom software through the use of a software factory is presented. After initiator block 202, which may be a creation of a contract between an enterprise client and a software factory service, input, from a Client Business Governance Board, is received at a software factory (block 204). This input is a detailed description of the custom software needs of the enterprise client. While such input is usually prepared and presented by human management of the enterprise client, alternatively this input may be the creation of a Unified Modeling Language (UML) based description of the needed software. Based on the client's input, a project software proposal definition is created by the Software Factory Governance Board of the software factory (block 206). This project software proposal definition is sent to the scheduling/dispatching department of the Software Factory Operations, which creates a software project.

The software project is then inducted (block 208). As will be described in more detail below, the project induction provides an initial introduction of the project to the software factory. Through the use of various parameters, including those found in records of other projects, checklists, et al., the project is initially evaluated. This evaluation includes determining if the software factory has the capacity, resources, bandwidth, etc. needed for the project. If so, then a determination is made as to whether the project is qualified for acceptance by the software factory. Such qualification includes, but is not limited to, determining if the project falls within the guidelines set by a Service Level Agreement (SLA) between the client enterprise and the software factory, whether the project conforms to legal guidelines such as Sarbanes-Oxley, etc. Based on these and other criteria, the project is scored for feasibility, profitability, and desirability for implementation. If the induction process concludes that the project should proceed, then it is categorized into a particular type of project (e.g., payroll, inventory control, database management, marketing, et al.).

If the induction process does not pass (query block 210), indicating that the project should not proceed, then the project is returned to the Client Business Governance Board for additional discussions between the Client Business Governance Board and the software factory, in order to induct a revised project (i.e., reinduct the software project). However, if the induction process passes, then the software project is parsed into major functional areas (block 212). That is, the project is divided up ("broken apart") in order to establish subunits that can later be integrated into a single custom software ("deliverable").

Work packets are then obtained for all of the functional areas of the software project (block 214). These work packets are reusable components which are described in detail below. The work packets are then stitched together (block 216) on an assembly line to create deliverable custom software that meets the criteria for the software project that has been established in the earlier steps. The custom software is then tested in the software factory (block 218). Once testing is completed, the custom software is delivered (block 220) to the client customer, who receives on-going support from the support team (block 222). The flow-chart ends at terminator block 224.

While the process has been described for the creation of custom software, the same process is used by a software factory for other activities, including creating a service for a customer, creating standardized software, etc. Thus, the software factory uses work packets to blend software (including reusable artifacts), protocols (e.g., how software will be transmitted, how individuals will be contacted, etc.), governance requirements (e.g., service level agreements that describe how much a service will cost) and operating environments (hardware and software, including operating systems, integrated environments such as SAP™, Rational™, etc.) into a single integrated product, which can then be used in a stand-alone manner or can be fed into another system/product.

Note that software factory 100 is virtual. That is, the different components (e.g., software factory governance board 108, software factory operations 110, design center 112, assembly line 120) may be located in different locations, and may operate independently under the control of information found in work packets 118. In a preferred embodiment, each of the different components of the software factory 100 publishes a set of services that the component can provide and a set of requirements for using these services. These services are functions that are well defined and made visible for outside entities to call.

For example, assume that assembly line 120 publishes a service that it can assemble only work packets that include code and protocol that utilize IBM's Rational™ software development platform. Thus, the assembly line 120 has published its service (set of services includes "assembling work packets") and the required protocol (set of requirements includes "utilize IBM's Rational™ software development platform") to the design center 112, which must decide if it wants (or is able) to utilize that particular assembly line 120. If not, then another assembly line from another software factory may be called upon by the design center 112. Behind each offered service are the actual processes that a component performs. These processes are steps taken by the service. Each step is performed by a section of software, or may be performed by an individual who has been assigned the task of performing this step. Each step utilizes leveraged tools, including the work packets 118 described herein. These work packets 118 then implement the process.

By utilizing published interfaces between the different components of the software factory 100, then different components from different software factories can be interchanged according to the capability offered by and protocol used by each component. This enables a "building block" architecture to be implemented through the use of different components from different software factories.

Life Cycle of a Work Packet

Figure 3:
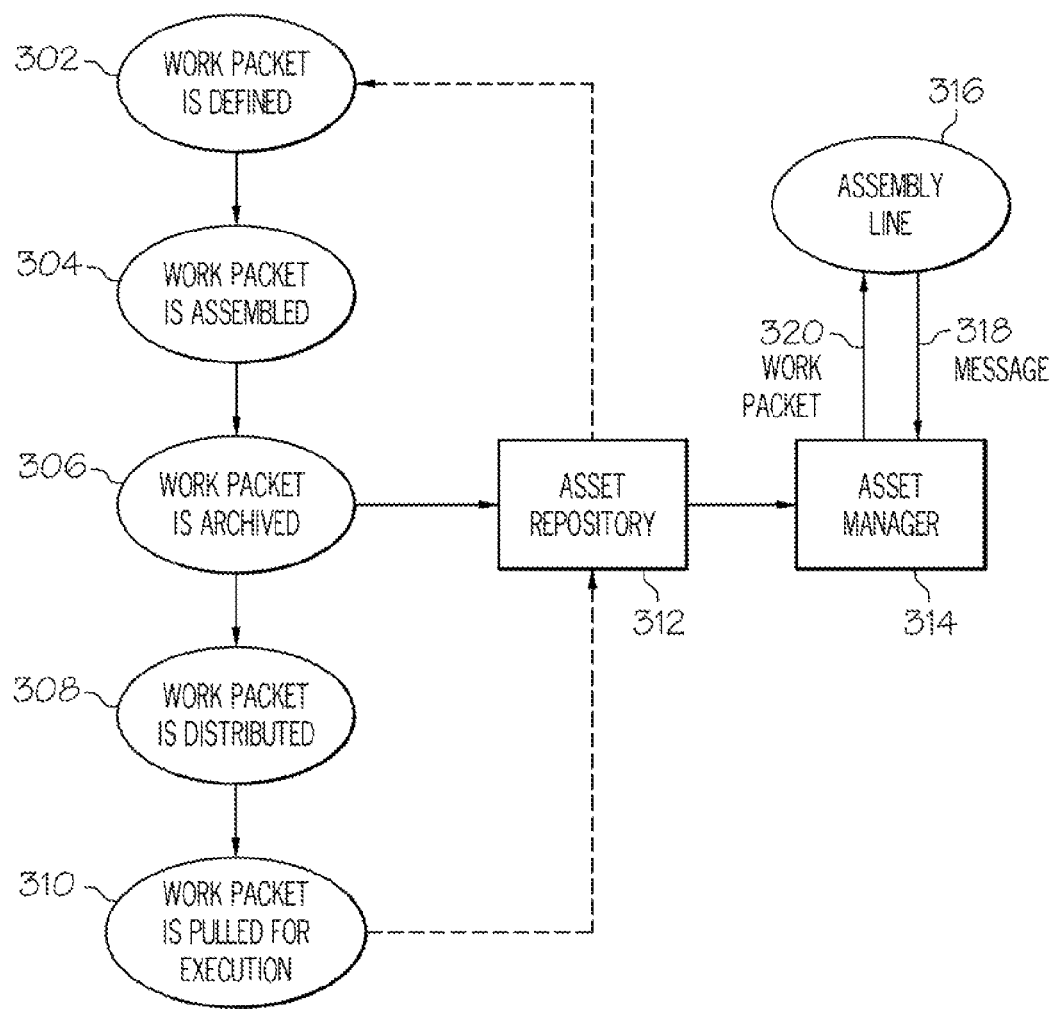
FIG. 3 presents an overview of the life cycle of work packets.

There are five phases in the life cycle of a work packet, which are shown in FIG. 3. These five phases are 1) Defining (block 302); 2) Assembling (block 304); Archiving (block 306); Distributing (block 308); and Pulling for execution (block 310). As indicated by the top dashed line coming out of asset repository 312, this life cycle may be recursive. That is, in one embodiment, work packets are modified an upgraded in a recursive manner, which includes the steps shown in FIG. 3. Once a work packet is assembled and archived, it is stored in an asset repository 312, whence the work packet may be accessed and utilized by an asset manager 314 for assembly into a deliverable by an assembly line 316. Note that the assembly line 316 can also send, to the asset manager 314, a message 318 that requests a particular work packet 320, which can be pulled (block 310) into the asset repository 312 by the asset manager 314. This pulling step (block 310), is performed through intelligent routing distribution (block 308) to the asset repository 312 and assembly line 316. The configuration of the routing distribution of the work packet 320 is managed by the asset manager 314, which is software that indexes, stores and retrieve assets created and used with the software factory.

Work Packet Components

A work packet is a self-contained work unit that comprises processes, roles, activities (parts of the job), applications, and necessary input parameters that allow a team to conduct a development activity in a formalized manner, with visibility to progress of their effort afforded to requesting teams. A work packet is NOT a deliverable software product, but rather is a component of a deliverable software product. That is, a work packet is processed (integrated into a system, tested, etc.) to create one or more deliverables. Deliverables, which were created from one or more work packets, are then combined into a custom software, such as an application, service or system.

In a preferred embodiment, a work packet is composed of the following eight components.

Governance Policies and Procedures—these policies and procedures include protocol definitions derived from a project plan. That is, a project plan for a particular custom software describes how work packets are called, as well as how work packets report back to the calling plan.

Standards—this component describes details about how work packets are implemented into a deliverable in a standardized manner. Examples of such standards are naming conventions, formatting protocol, etc.

Reused Assets—this component includes actual code, or at least pointers to code, that is archived for reuse by different assembled deliverables.

Work Packet Instructions—this component describes detailed instructions regarding how a work packet is actually executed. That is, work packet instructions document what work packets need to be built, and how to build them. These instructions include a description of the requirements that need to be met, including design protocols, code formats, and test parameters.

Integration Strategy—this component describes how a set of work packets, as well as deliverables developed from a set of work packets, are able to be integrated into a client's system. This component includes instructions regarding what processes must be taken by the client's system to be prepared to run the deliverable, as well as security protocols that must be followed by the deliverable. The component may also include a description of how one deliverable will interact with other applications that are resident to the client's computer system.

Scheduling—this component describes when a set of work packets are to be sent to an assembly line, plus instructions on monitoring the progress and status of the creation of the work packet.

Exit Criteria—this component includes instructions (e.g., through the use of a checklist) for deploying a deliverable to the client's system. That is, this component is the quality criteria that the deliverable must meet before it can be considered completed and acceptable for a project.

Input Work Products—this component includes Input/Output (I/O) templates that are used to describe specific work products that are needed to execute the activities of the work packet (in the assembly line) to build the deliverable.

Defining a Work Packet

The process of defining a work packet is called a "work packet definition process." This process combines critical references from governance, factory operations (e.g., factory management, project management), business criteria, and design (including test) artifacts. Structured templates enable governance, design center, and factory operations to define the referenced artifacts by filling in corresponding functional domain templates, thus defining the contents of the work packet. Thus, a work packet includes not only reusable software code, but also includes governance and operation instructions. For example, a work packet may include directions that describe a sequence of steps to be taken in a project; which data is to be used in the project; which individuals/departments/job descriptions are to perform each step in the project; how assigned individuals/departments are to be notified of their duties and what steps/data are to be taken and used, et al. Thus, each work packet includes traceability regarding the status of a job, as well as code/data/individuals to be used in the execution of a project.

Thus, work packets are created from unique references to governance, factory operations (factory mgt, project mgt), business, and design (including test) artifacts. The packet definition process provides structure templates that enable governance, design center, and factory operations to define referenced artifacts (newly defined artifact identifiers or any reusable part of existing work packet definitions), by filling in corresponding functional domain (e.g., eXtensible Markup Language—XML) templates. What can be defined may be controlled by a Document Type Definition (DTD). The DTD states what tags and attributes are used to describe content in the deliverable, including where each XML tag is allowed and which XML tags can appear within the deliverable. XML tag values are defined and applied to a newly defined XML template for each functional area of a design center. These XML templates are then merged into one hierarchical structure when later assembled into finalized work packets.

Figure 4:
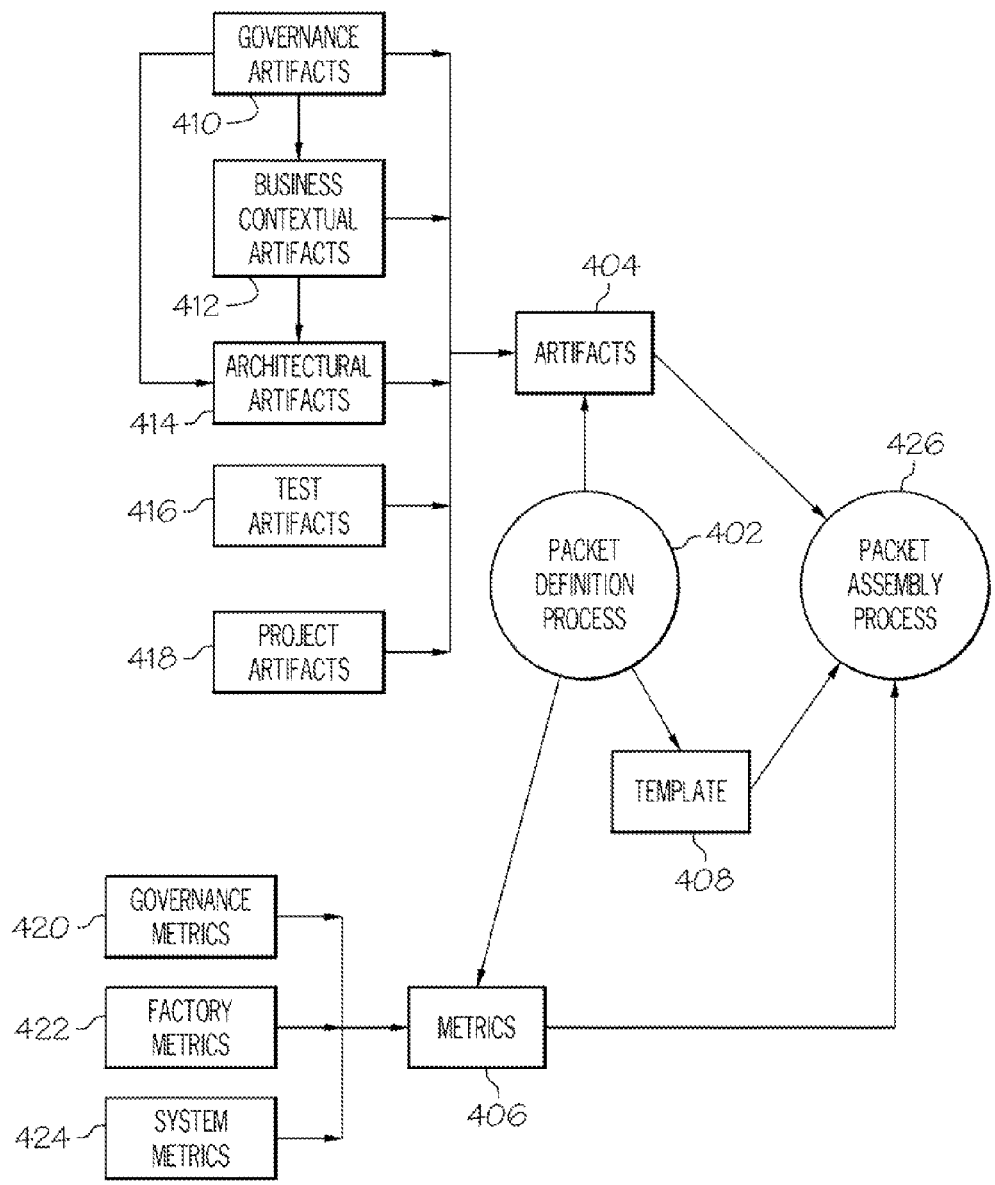
FIG. 4 presents an overview of an environment in which work packets are defined and assembled.

With reference now to FIG. 4, an overview of the environment in which a packet definition process 402 occurs is presented. The packet definition process 402 calls artifacts 404, metrics 406, and a template 408 to define a work packet. The artifacts may be one or more of: governance artifacts 410 (intellectual assets produced in the software factory by the Software Factory Governance Board 108 described in FIG. 1); business contextual artifacts 412 (intellectual assets produced in the software factory by business analysts in the requirement analysis team 114 described in FIG. 1); architectural artifacts 414 (intellectual assets produced by the architecture team 116 described in FIG. 1); test artifacts 416 (intellectual assets produced by test architects in the architecture team 116 shown in FIG. 1); and project artifacts 418 (intellectual assets produced in the software factory by system engineers in the design center 112 shown in FIG. 1).

The metrics 406 may be one or more of: governance metrics 420 (measurable governance indicators, such as business plans); factory metrics 422 (measurable indicators that describe the capabilities of the software factory, including assembly line capacity); and system metrics 424 (measurable indicators that describe the capabilities of the client's computer system on which deliverables are to be run).

Based on a template 408 for a particular deliverable, artifacts 404 and metrics 406 are used by a packet assembly process 426 to assemble one or more work packets.

Assembling a Work Packet

Template 408, shown in FIG. 4, describes how a work packet is to be assembled. The template 408 includes metadata references to key artifacts 404 and metrics 406, which are merged into a formal work packet definition as described above. The work packet is then assembled in a standardized hierarchical way and packaged within a factory message envelope that contains a header and body.

Figure 5:
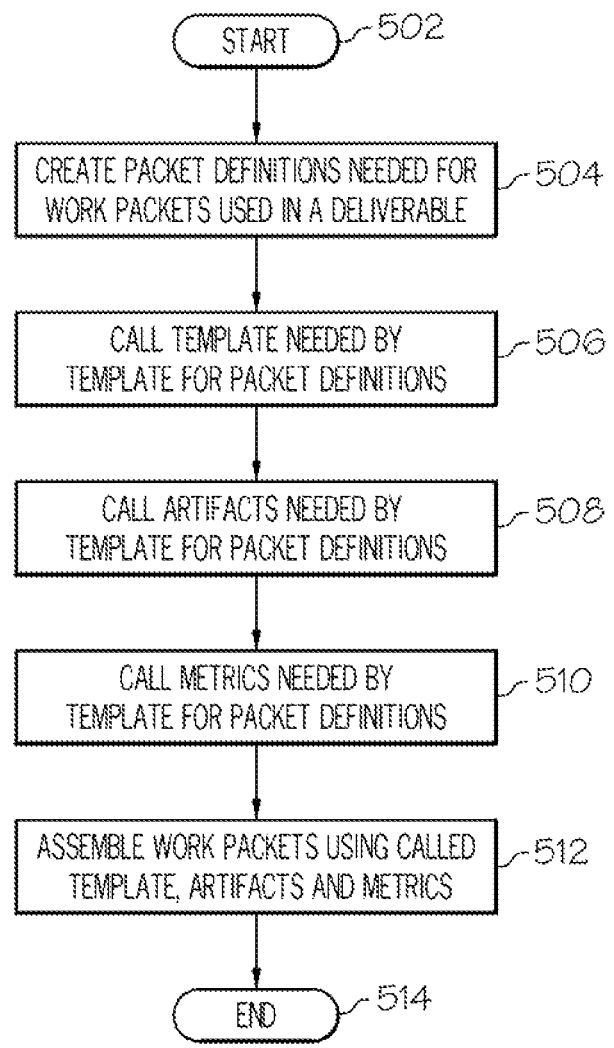
FIG. 5 is a high-level flow-chart of steps taken to define and assemble work packets.

With reference now to FIG. 5, a high-level flow-chart of steps taken to define and assemble work packets is presented. After initiator block 502 (which may be an order by the Requirements Analysis Team 114 to the Architecture Team 116, shown in FIG. 1, to create a design center-defined work packet), the requisite packet definitions are created for work packets that are to be used in deliverables (block 504). First, a template, which preferably is a reusable that has been used in the past to create the type of work packet needed, is called (block 506). Based on that called template, the needed artifacts (block 508) and metrics (block 510) are called. Using the template as a guide, the called artifacts and metrics are assembled in the requisite work packets (block 512), and the process ends.

Archiving Work Packets

As stated above, work packets are fungible (easily interchangeable and reusable for different deliverables). As such, they are stored in an archival manner. In order to retrieve them efficiently, however, they are categorized, classified, and named. For example, consider the header 600 shown in FIG. 6a. Header 600 is associated with a specific work packet 602 that includes software code 604. The name of the work packet is created by the architect who originally created the work packet 602. Preferably, the name is descriptive of the function of the work packet 602, such as "Security work packet", which can be used in the assembly of a security deliverable. The header may describe whether the work packet is proprietary for a particular client, such that the work packet may be reused only for that client. A description (coded, flagged, etc.) for what the work packet is used for may be included, as well as the names of particular components (such as the eight components described above).

Figure 6A:
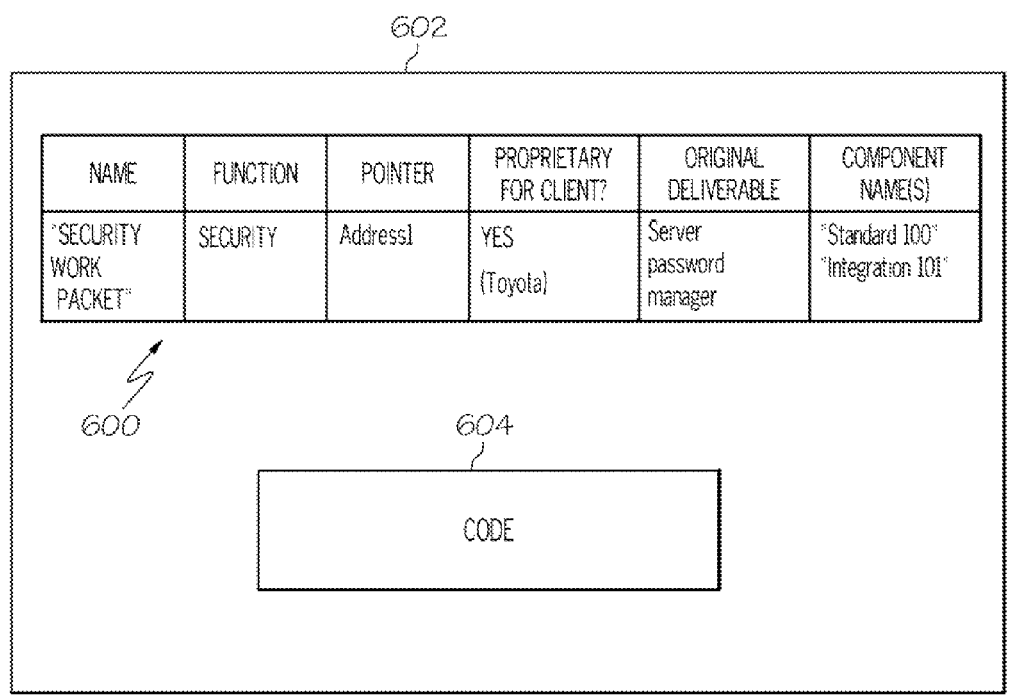
FIGS. 6a-b illustrate an exemplary header in a work packet.
Figure 6B:
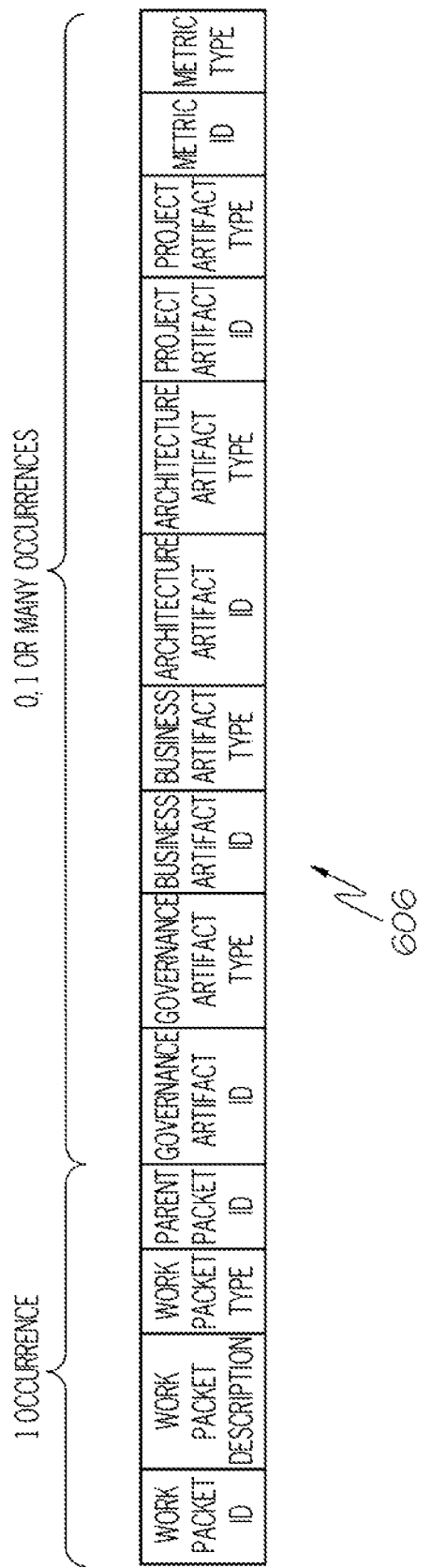

An alternate header for a work packet is shown in FIG. 6b as header 606. Note that the header 606 for every work packet contains the first four values shown ("Work Packet ID," "Work Packet Description," "Work Packet Type," and "Parent Packet ID"). That is, each work packet has a unique identification number ("Work Packet ID"), a short description of the work packet ("Work Packet Description"), a description of the type of work packet ("Work Packet Type," such as "security," "spreadsheet," etc.), and the identifier ("Parent Packet ID") of any parent object from which the work packet has inheritance.

Exemplary pseudocode for defining the work packet is:

```
[Work Packet Definition - Stored in Asset Repository]
<Factory Envelope ClientCode = 999, Version =1.0 , FactoryInstanceID = 012, ProjectID=1001>
<Header>
.....
.....
.....
......
</Header>
<Body>
<Asset ID>
<Asset Type>
<Project Type>
<Work Packet ID = ####,CreationDate =011007, Source = DC100>
<Work Packet Description>
<Work Packet Type [1-90]>
<Parent Packet ID = ####>
<Governance>
<Governance_Artifact ID = #### Type = 1 [Policy,Procedure,]>
<Governance_Artifact ID .....>
<Governance_Artifact ID ....>
<Governance_Artifact ID ....>
</Governance>
<Business>
<Business_Artifact ID = ### Type = 2 [1=Success Factor, 2=Use Case, 3=Business Context, 4= NFR, etc>
<Business_Artifact ID = ### Type = 2>
<Business_Artifact ID = ### Type = 2>
<Business_Artifact ID = ### Type = 2>
</Business>
<Architecture Artifact ID Type = 3 [ 1= Information, 2=Data, 3=Application,4=Integration, 5=Security, 6=System, 7=Test, etc.]>
<Architecture_Artifact ID >
<Architecture_Artifact ID >
<Architecture_Artifact ID >
<Architecture_Artifact ID >
<Architecture_Artifact ID>
<Architecture_Artifact ID>
<Architecture_Artifact ID>
<Architecture_Artifact ID>
</Architecture>
<Project ID = xxx>
<Project Artifact ID = ####>
<Project Artifacts>
<Project Metrics>
</Project>
</Work Packet>
</Body>
</Factory Envelope>
```

Figure 7:
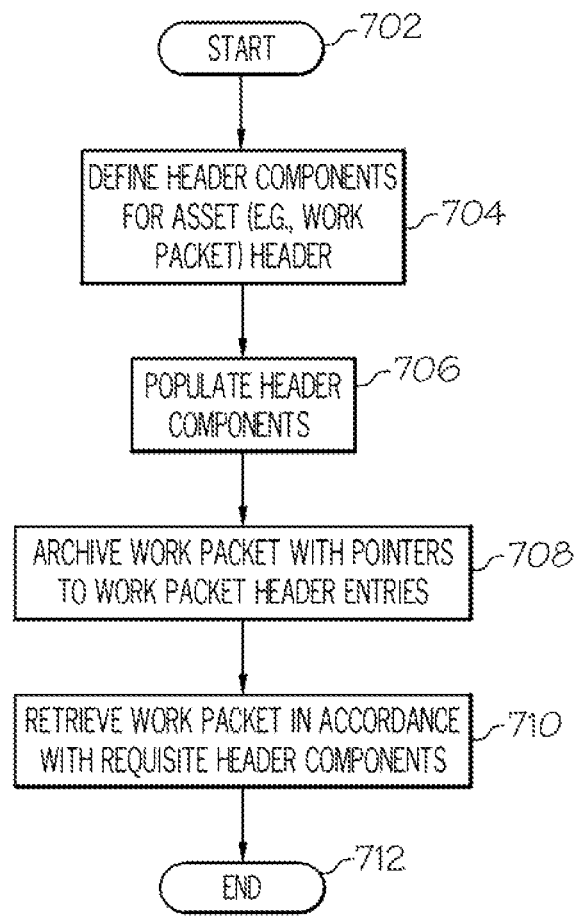
FIG. 7 is a high-level flow-chart of steps taken to archive a work packet.

With reference now to FIG. 7, a high-level flow chart of steps taken to archive a work packet is presented. After initiator block 702, an architect defines header components for an asset (e.g. a work packet) header (block 704). Note that these header components allow an Asset Repository to perform a metadata categorization search of the assets. These header components may be any that the programmer wishes to use, including those shown in exemplary manner in FIGS. 6a-b. After the header components are defined, the architect populates them with descriptors (block 706). A system manager or software then archives (stores) the work packet, including the header (block 708). At a later time, a program or programmer can retrieve the work packet by specifying information in the header (block 710). For example, if the program or programmer needs a work packet that is of a "Security" type that follows "Standard 100", then "Work packet one" can be retrieved at "Address 1", as depicted in FIG. 6a. Note, however, that this work packet cannot be utilized unless it is to be used in the construction of a deliverable for the client "Toyota." The process ends at terminator block 712.

Software Factory Readiness Review

Before a software factory can receive an order from a client to create work packets and their resultant deliverables/applications, a determination should be made to determine whether the factory is ready to take on project work. This determination can be made through the use of a scorecard, which provides a maturity assessment of the factory. An exemplary scorecard is as follows:

1. Factory Resource Plan (Business and IT Environment) completed
2. Infrastructure (Hardware, Network) procurement complete
3. Operational Software installed
4. Integrated Tools installed
   a. Design Center
      i. Requirement Management,
      ii. Business Modeling
      iii. Architectural Modeling
      iv. Test Management
      v. Configuration (Release) Management
      vi. Change Management
   b. Execution Units
      i. IDE (Integrated Development Environment)
5. Automate information handled (Service Oriented Architecture (SOA)—reusable model for Factory Installations)
6. Process, equipment and product data integrated and statistically analyzed
7. Enterprise Service Bus installed
   a. Common Services
      i. Audit (DB)
      ii. Business Transaction Monitoring
      iii. Performance Monitoring
      iv. System Monitoring
      v. Message Translation/Transformation
      vi. Analysis (Data Analytics)
      vii. Packet Assembly
      viii. Session Mgt
      ix. Security Model Configuration
      x. Process Server Configuration
      xi. Communication Protocol Bridges
   b. Resource Mgt
   c. Asset Mgt
   d. Portal Server
   e. Factory Induction Server
   f. Message Oriented Middleware
      i. Hub
      ii. Router (DB)
      iii. Persistent and Durable Queues (Databases)
   g. Service Activators (Shared Components)
8. Workflow Engine installed
9. Workflow Event Model configured
10. Problem-solving organization (internal factory operations (infrastructure) maintenance developed
11. Operational Support (System, Open Communication Channel, Defined and Enforced Process and Procedures) hosted
12. Project Management Plan in place
13. Project Scheduled
14. Factory Activity scheduled
15. On-boarding—Setup and configuration
16. Ongoing capacity planned
17. Execution Units (Assembly Line) Balanced
18. Human Resources Planned
    a. Reduce the division of labor
    b. Secure the requisite talent
19. Factory process implemented to make factory mistake-proof (continued process improvement)
20. Introductions and assembly of new process technology managed
21. In-line assembly inspected (done via Reviews)
22. Factory induction process in place
23. Communication channels cleared and defined In one embodiment of the present invention, all of these steps are taken before a project is taken on by the Software Factory Governance Board 106 described above in FIG. 1. These steps ensure the health and capacity of the software factory to create and assemble work packets into a client-ordered deliverable.

Software Factory on-Boarding

As indicated in Step 15 of the Factory Readiness Review process, software factory on-boarding is a rapid process that uses a series of checklist questionnaires to help with the rapid set-up and configuration of the software factory.

The software factory on-boarding process is an accelerator process model that enables the roll out configuration of uniquely defined software factor instances. This is a learning process that leverages patterns used in prior on-boarding exercises. This evolution provides a pertinent series of checklist questionnaires to qualify what is necessary for a rapid set-up and confirmation of a factory instance to support a project. Based on project type assessments, installed factory patterns can be leveraged to forecast what is necessary to set up a similar factory operation.

Exemplary steps taken during a rapid software factory on-boarding are:

a. Auto-recipe (configuration) download
   i. Populate Activities/Task into workflow
   ii. Configure Message Router
   iii. Configure (queues) communication channels per governance model
   iv. Set up logistics (assess, connectivity) internal maintenance team support (location)
   v. Fast ramp new production processes
   vi. Configure Security model
      1. User accounts
      2. Roles and privileges
         a. Network Access
         b. OS File Directory
         c. Database
   vii. Configure Event Model
   viii. Configure Infrastructure Servers
   ix. Distribute Network Logistics
b. Resource Allocation (including human resources available)

Rapid on-boarding provides a calculated line and work cell balancing capability view of leveraged resources, thus improving throughput of assembly lines and work cells while reducing manpower requirements and costs. The balancing module instantly calculates the optimum utilization using the fewest operators to achieve the result requested. Parameters can be varied as often as needed to run "what-if" scenarios.

Figure 8:
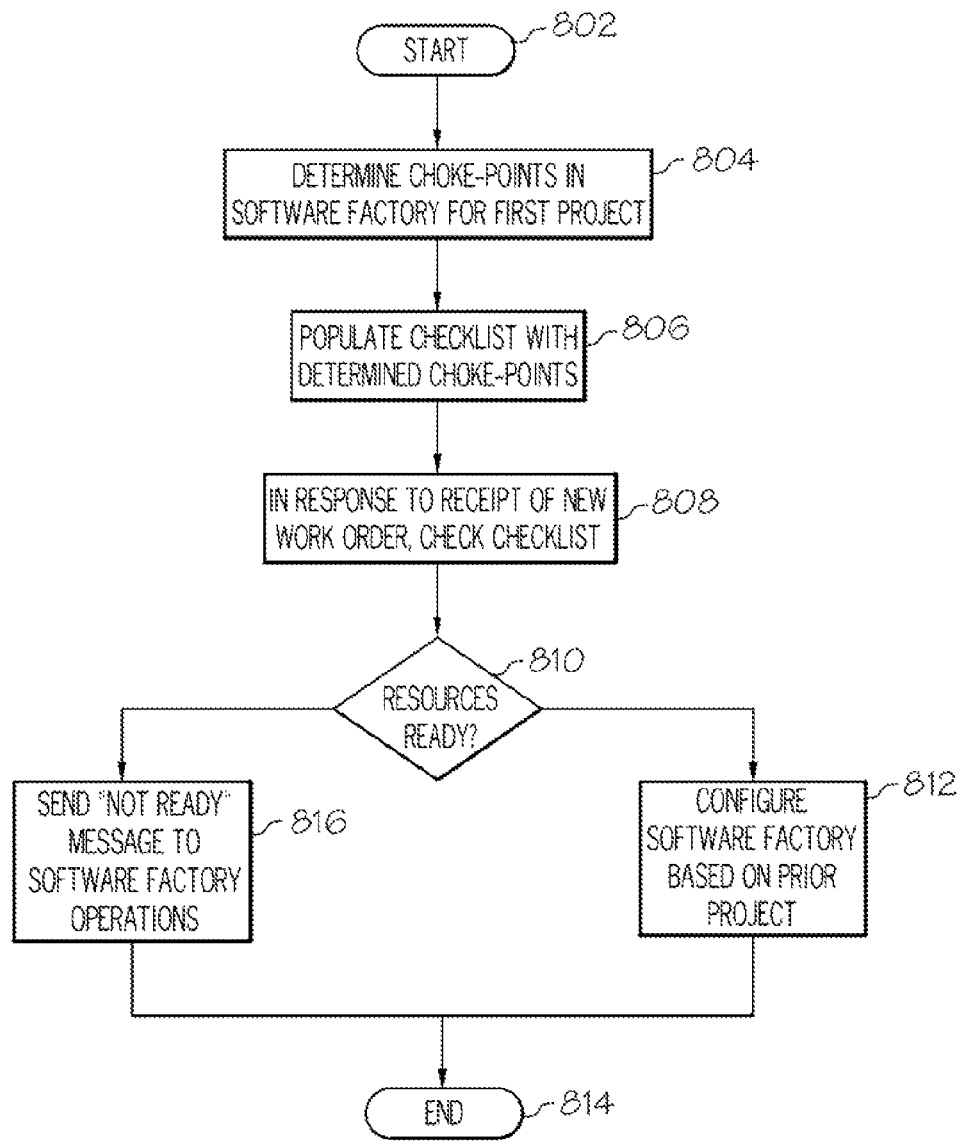
FIG. 8 is a high-level flow-chart of steps taken to rapidly on-board a software factory.

With reference now to FIG. 8, a high-level flow-chart of exemplary steps taken for rapidly on-boarding a software factory is presented. After initiator block 802, processes used by a software factory, including choke-points, are determined for a first project (block 804). These processes (and perhaps choke-points) lead to a checklist, which describes the processes of the first process (block 806). Examples of processes include, but are not limited to, the creation of work packets, testing work packets, etc. Examples of choke-points include, but are not limited to, available computing power and memory in a service computer in which the software factory will run; available manpower; available communication channels; etc. When a new work project comes in to the software factory, the checklist can be used by the Software Factory Operations 110 (shown in FIG. 1) to check processes/choke-points that can be anticipated by the new work project (block 808). That is, assume that the first project and the new project are both projects for creating a computer security program. By using a checklist that identifies similar mission-critical processes and/or choke-points when creating a computer security program, a rapid determination can be made by a programmer (or automated software) as to whether the software factory is capable of handling the new work project. If the checklist is complete, indicating that all mission-critical resources are ready and no untoward choke-points are detected (block 810), then the software factory is configured (block 812) as before (for the first project), and the process ends (terminator block 814). However, if the resources are not ready, then a "Not Ready" message is sent back to the Software Factory Operations (such as to the Software Factory Governance Board) (block 816), thus ending the process (terminator block 814), unless the Software Factory Governance Board elects to retry configuring the software factory (either using the rapid on-board process or the full process described above).

Project Induction Process

Before a software project is accepted by the software factory, it should first be inducted. This induction process provides an analysis of the proposed software project. The analysis not only identifies what processes and sub-processes will be needed to create the software project, but will also identify potential risks to the software factory and/or the client's computer system.

Figure 9:
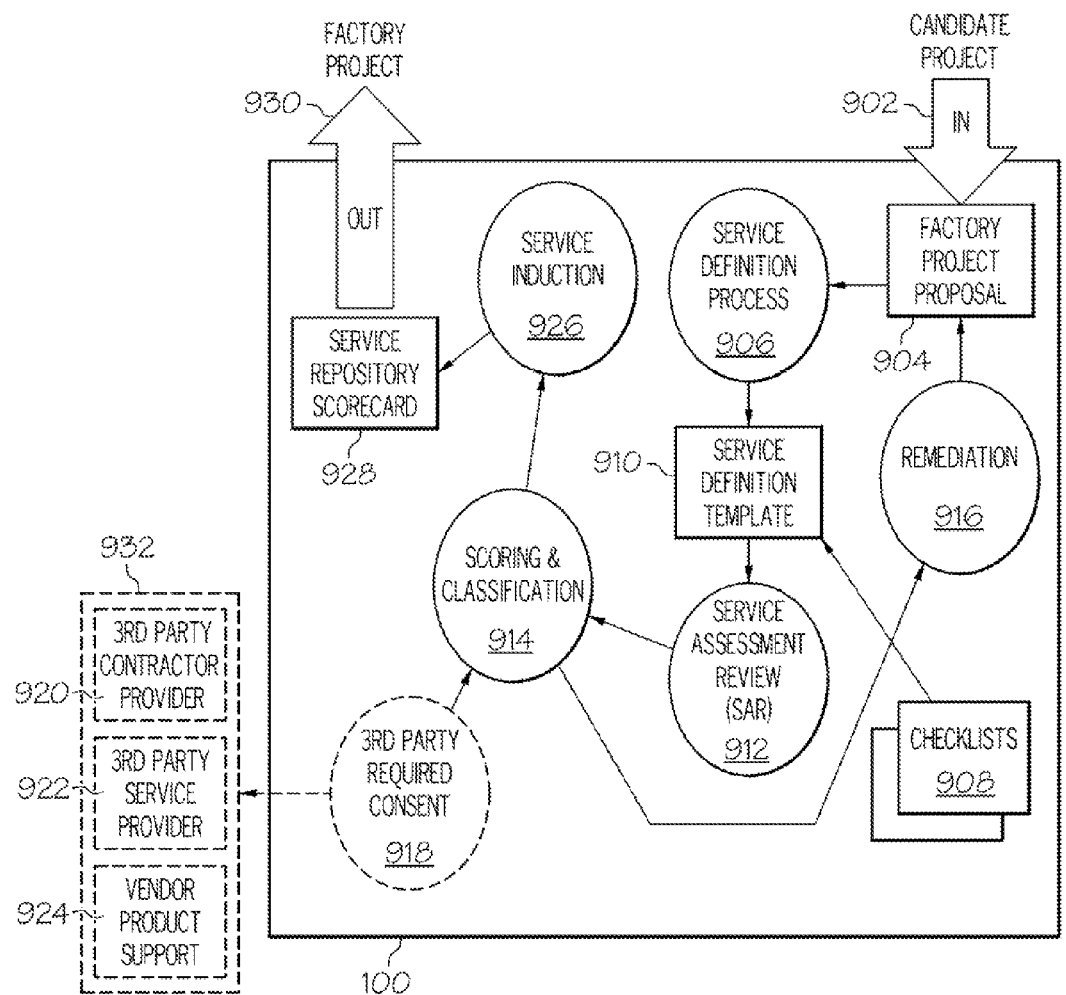
FIG. 9 is a flow-chart of exemplary steps taken to induct a project.

With reference now to the flow-chart shown in FIG. 9, a candidate project 902 is submitted to software factory 100 (preferably to the Software Factory Governance Board 108 shown in FIG. 1) as a factory project proposal 904. The factory project proposal 904 then goes through a service definition process 906.

Figure 10A:
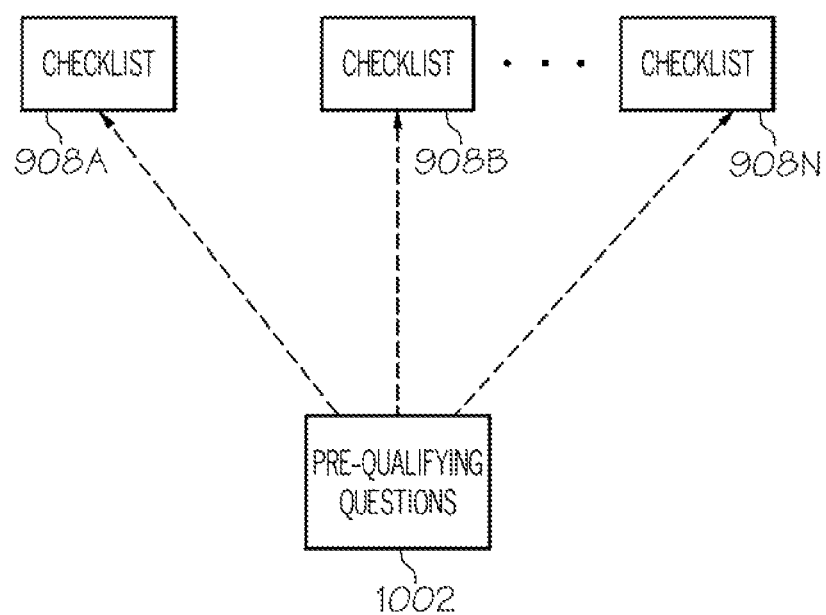
FIG. 10a shows a relationship between pre-qualifying questions and checklists used to induct a project.

Service definition process 906 utilizes electronic questionnaire checklists 908 to help define a service definition template 910. Checklists 908 are a collection of drill down checklists that provide qualifying questions related to the candidate project 902. The questions asked in the checklists 908 are based on pre-qualifying questions. That is, as shown in FIG. 10a, pre-qualification questions 1002 are broad questions that relate to different types of projects. Based on the answers submitted to questions in the pre-qualification questions 1002, a specific checklist from checklists 908a-n is selected. Thus, assume that pre-qualification questions 1002 include four questions: 1) Who is the client? 2) Is the project security related? 3) Will the project run on the client's hardware? 4) When is the proposed project due? Based on answers that are input by the client or the software factory governance board, one of the checklists 908 will be selected. That is, if the answers for the four questions were 1) Toyota, 2) Yes, 3) Yes and 4) Six months, then a checklist 908b, which has questions that are heuristically known (from past projects) to contain the most relevant questions for such a project is then automatically selected.

Returning to FIG. 9, the selected checklists 908 are then used to generate the service definition template 910, which is essentially a compilation of checklists 908 that are selected in the manner described in FIG. 10a. Service definition template 910 is then sent to a Service Assessment Review (SAR) 912. SAR 912 is a weighted evaluation process that, based on answers to qualifying, and preferably closed ended (yes/no), questions derived from the service definition template 910, evaluates the factory project proposal 904 for completeness and preliminary risk assessment. SAR 912 provides an analysis of relevant areas of what is known (based on answers to questions found in the service definition template 910) and what is unknown (could not be determined, either because of missing or unanswered questions in the service definition template 910) about the candidate project 902. Thus, the outcome of SAR 912 is a qualification view (gap analysis) for the factory project proposal 904, which provides raw data to a scoring and classification process 914.

The scoring and classification process 914 is a scoring and tabulation of the raw data that is output from SAR 912. Based on the output from SAR 912, the scoring and classification process 914 rates the factory project proposal 904 on project definition completeness, trace-ability and risk exposure. If the service definition template 910 indicates that third parties will be used in the candidate project 902, then the scoring and classification process 914 will evaluate proposed third party providers 932 through the use of a third party required consent process 918.

The third party required consent process 918 manages relationships between third party providers 932 and the software factory 100. Example of such third party providers 932 include, but are not limited to, a third party contractor provider 920 (which will provide software coding services for components of the candidate project 902), a third party service provider 922 (which will provide an execution environment for sub-components of the candidate project 902), and vendor product support 924 (which provides call-in and/or on-site support for the completed project). The determination of whether the third party providers 932 and the software factory 100 can work in partnership on the project is based on a Yes/No questionnaire that is sent from the software factory 100 to the third party providers 932. The questionnaire that is sent to the third party providers 932 includes questions about the third party's financial soundness, experience and capabilities, development and control process (including documentation of work practices), technical assistance that can be provided by the third party (including available enhancements), quality practices (including what type of conventions the third party follows, such as ISO 9001), maintenance service that will be provided, product usage (including a description of any licensing restrictions), costs, contracts used, and product warranty.

If the factory project proposal 904 fails this scoring process, it is sent back to a remediation process 916. However, if scoring process gives an initial indication that the factory project proposal 904 is ready to be sent to the software factory, then it is sent to the service induction process 926.

Once the factory project proposal 904 has gone through the SAR process 912 and any third party coordination has been met, scored and classified, the factory project proposal 904 is then inducted (pre-qualified for approval) by the service induction process 926. During the service induction process 926, the scored and classified project is sent through a Conceptual Requirements Review, which utilizes a service repository scorecard 928 to determine if the software factory 100 is able to handle the candidate project 902. That is based on the checklists, evaluations, scorecards and classifications depicted in FIG. 9, the candidate project 902 receives a final evaluation to determine that the software factory 100 has the requisite resources needed to successfully execute the candidate project 902. If so, then the candidate project becomes a factory project 930, and a contract agreement is made between the client and the service provider who owns the software factory 100.

Dynamic Generation of Software Packets

As described herein, work packets are created in accordance with the client's needs/capacities. An optimal way to determine what the client's needs/capacities are is through the use of checklists. A standard checklist, however, would be cumbersome, since standard checklists are static in nature. Therefore, described now is a process for generating and utilizing dynamic checklists through the use of a Software Factory Meta-Morphic Dynamic Restructuring Logic Tree Model. This model provides the means to expedite checklist data collections, by dynamically restructuring and filtering non-relevant checklist questions, depending on answers evaluated in real time. Such a model not only enables a meta-data driven morphing of decision tress that adopt to the relevancy of what is deemed an applicable line of questioning, but also provides a highly flexible solution to pertinent data collection.

As now described, the Software Factory Meta-Morphic Dynamic Restructuring Logic Tree Model qualifies answers to checklist questions to determine if a next checklist is relevant to what is needed to determine what type of work packets are needed for the client's project. This expedites the data collection and analysis process, and thus provides a scalable flexibility to data collection and logic decision tree processing and constructions.

Figure 10B:
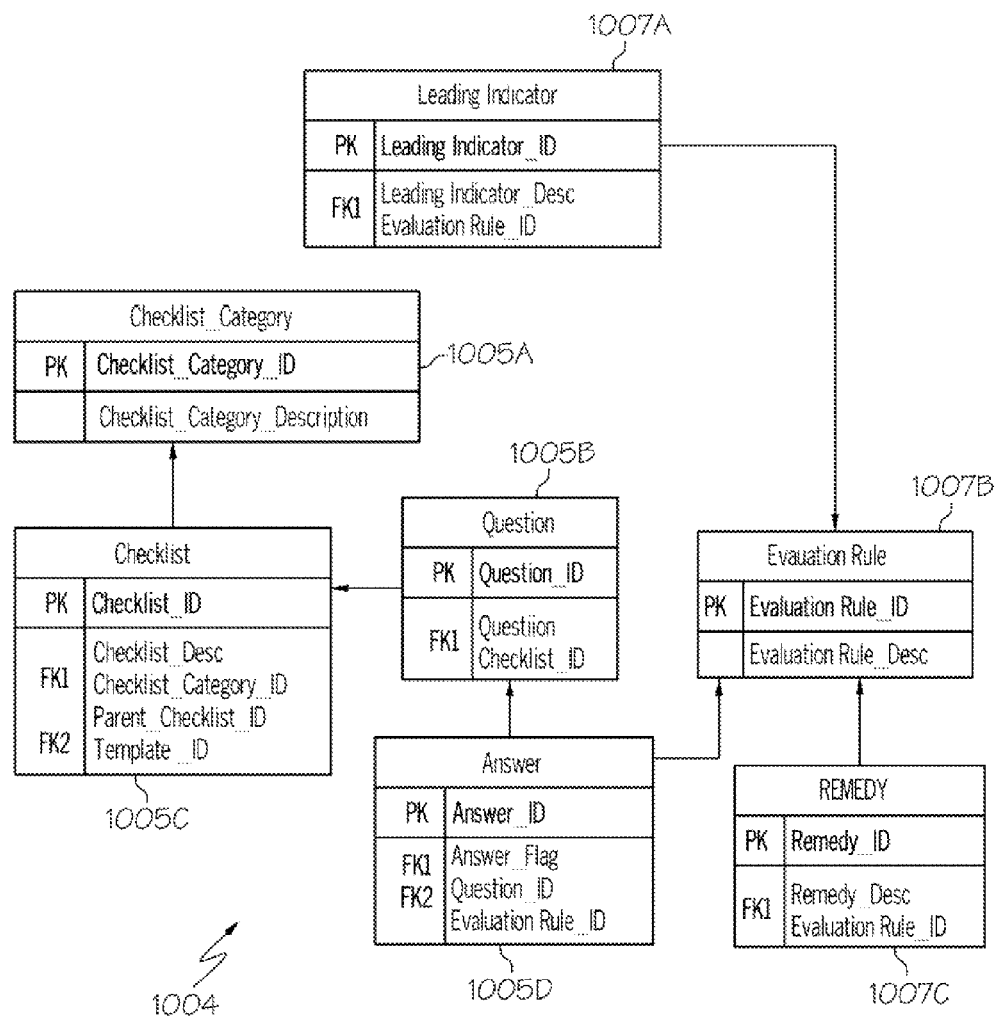

Referring now to FIG. 10b, a software diagram 1004 shows a relationship between different software objects used to dynamically generate checklists used to determine what work packets are needed to create a deliverable. Objects 1005a-d are used to track and receive answers to a particular checklist, while objects 1007a-c are used to evaluate each checklist to determine if it is relevant to the inquiry needed for determining what work packets are needed for a project related to a particular checklist category.

Figure 10D:
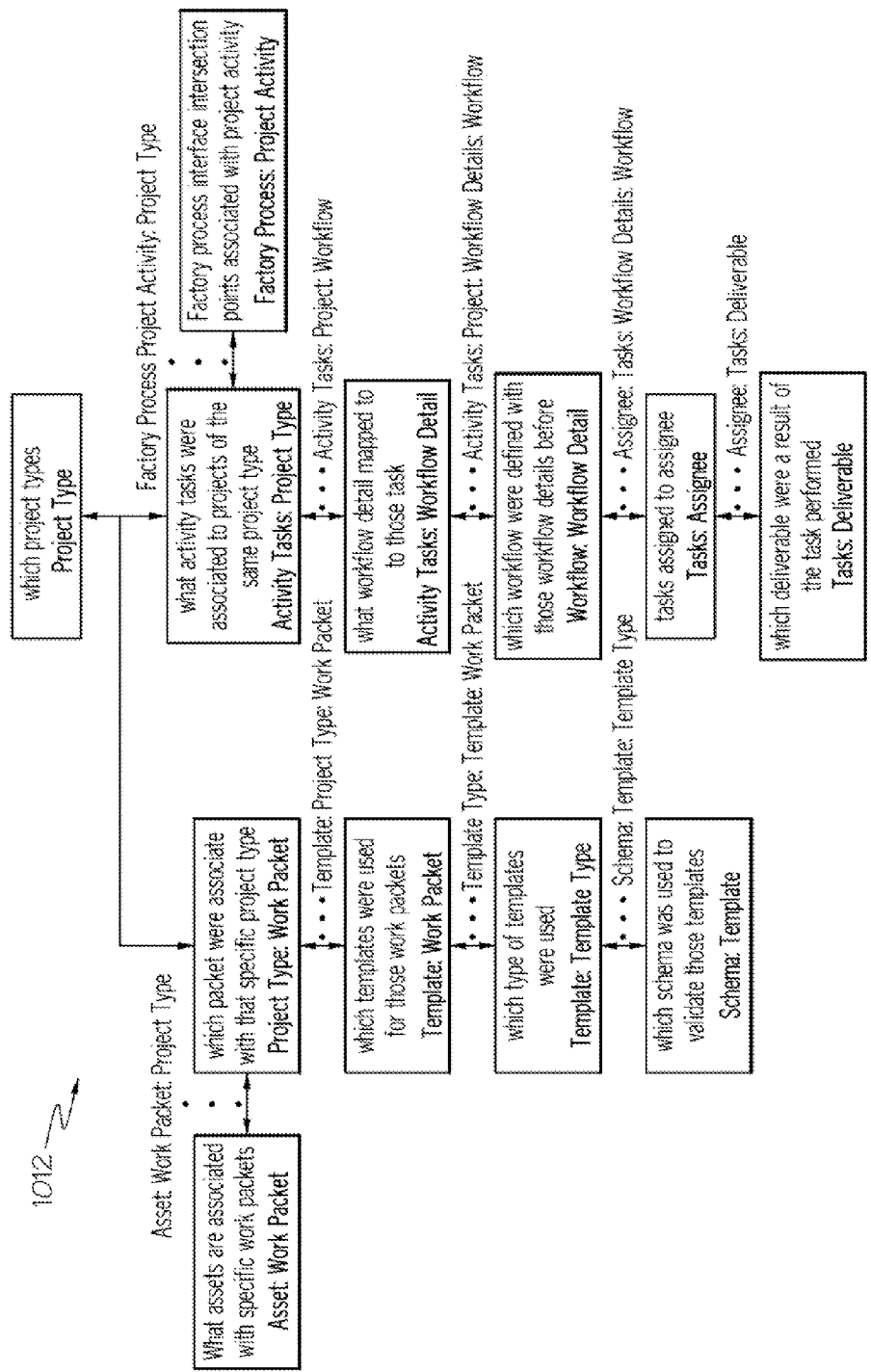

Referring now to FIG. 10c, a Software Factory Packet Pattern Analysis and Predictive Forecasting Model 1006, which is an excerpt of a Software Factory data model, shows the relational pattern between areas of pattern analysis. FIG. 10d shows a pattern 1012 of relationships between different assets, project types, templates, schema, tasks and processes. These relationships are a by-product of the Software Factory Packet Pattern Analysis and Predictive Forecasting Model 1006 shown in FIG. 10c.

Figure 10E:
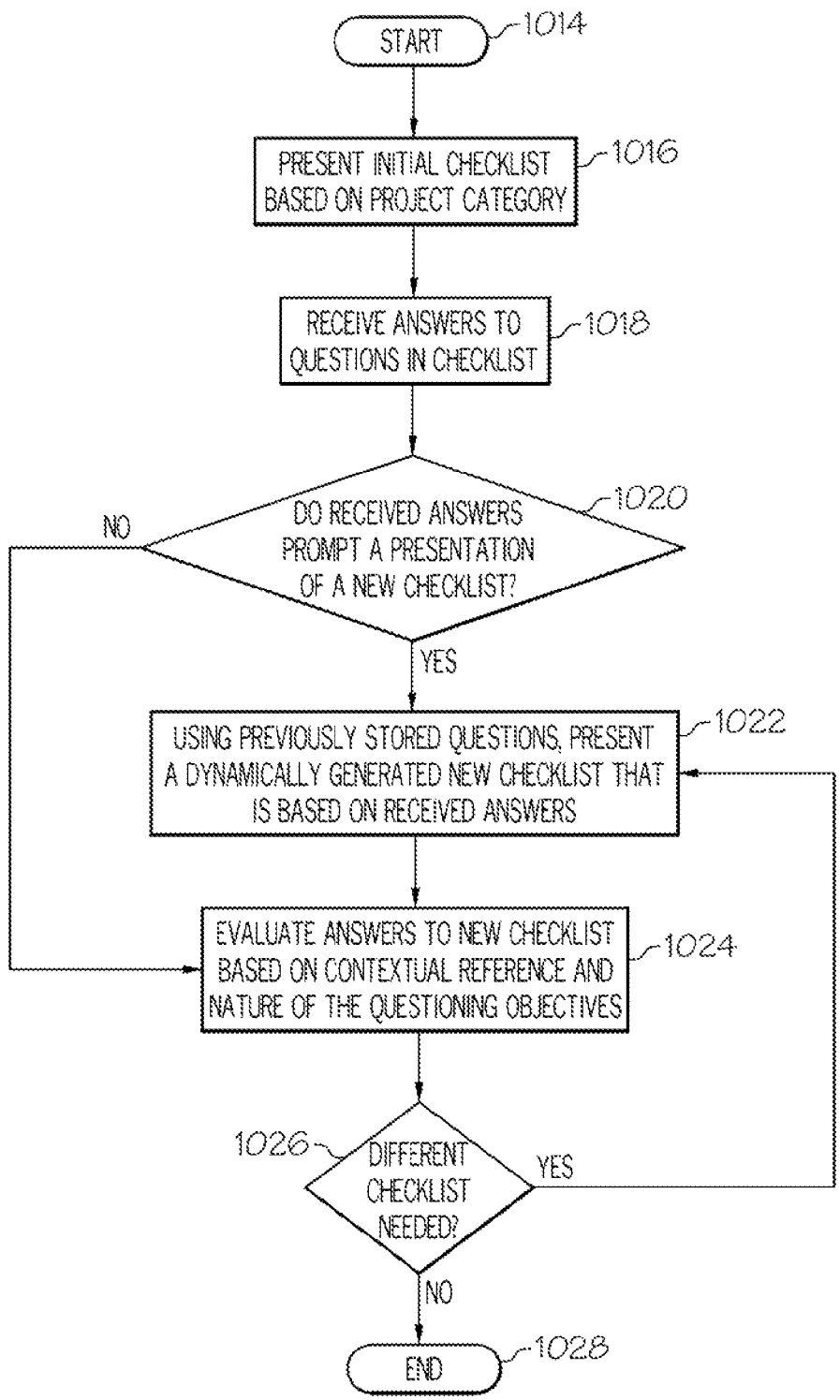

To tie together the details shown in FIGS. 10b-d, a high-level flow-chart of steps taken to dynamically manage checklists used to select appropriate work packets in a software factory is presented in FIG. 10e. After initiator block 1014, which may be prompted by a client requesting a deliverable from the software factory, an initial checklist is presented (block 1016). This checklist consists of a series of question groups, which are categorized according to a particular type of deliverable. For example, a security software program may be associated with a particular checklist category for "security software." As described in block 1018, answers to the first group of questions are received by the Software Factory Packet Pattern Analysis and Predictive Forecasting Model 1006 shown in FIG. 10c. If the received answers prompt a new series of questions (query block 1020), then a dynamically generated new checklist is created (block 1022). Note that this new checklist is not merely an existing node in a decision tree. Rather, based on received answers, a new checklist is dynamically created using stored questions that are tagged and associated with a particular set of answers. Thus, if a set of two questions resulted in respective answers "True" and "False", this would results in a different set of next questions than what would be generated if the respective answers were "True" and "True" (or any other combination of answers other than "True" and "False").

Referring now to block 1024, answers to the new checklist are evaluated based on their contextual reference and the nature of the questioning objectives. That is, based on what question parameters are used for the work packets being generated, a determination can be made as to whether additional new checklists need to be constructed (query block 1026). If so, then the process returns to block 1022 in an iterative manner. If not, then the process ends (terminator block 1028), indicating that the checklist process for determining what qualities are needed in the work packets has concluded.

Referring again to block 1024, note that leading indicator can influence how answers are evaluated. Such leading indicators include descriptors of the final deliverable that will be generated by the software factory, a client's name or field, etc. As leading indicators change, they can change content relevance and perspective reference points and drive the restructuring of relevant questions that can be restructured along that leading indicator relative perspective.

As thus described, for every answer collected by a question posed on a checklist and the scope of the question, all answers are evaluated for relevancy (scope, project type and contextual reference etc.). If a question becomes irrelevant, then that question is filtered and not asked in future questionnaires having a similar context. This provides a highly flexible solution for essential pertinent data collection. That is, the line of questioning and the decision tree changes with each new iteration (thus creating a dynamic logic tree that restructures itself, depending on how it used by maintaining a contextual reference base). Like water reforming into a drop, no matter how many times and in what manner a set of questions is parsed into segments, the set of questions reforms its remnants into a new wholly formed structure.

Software Factory Health Maintenance

The software factory described herein should be monitored for a variety of issues. Such monitoring is performed by a Software Factory Analytics and Dashboard, which ensures that both a single instance and multiple instances of the Factory can function smoothly. The monitored metrics include project metrics as well as factory operations, system, business, and performance activities. The analytics of the overall health of the factory can be audited and monitored and used as a basis for continual process improvement strategic analysis and planning This ensures fungibility and consistency, provides quality assurance, reduces the risk of failure, and increases cost effectiveness.

The health of the software factory is monitored through messages on an Enterprise Service Bus (ESB), which is a bus that is that couples the endpoint processes of the software factory with dashboard monitors. An ESB provides a standard-based integration platform that combines messaging, web services, data transformation and intelligent routing in an event driven Service Oriented Architecture (SOA). In an ESB-enabled, event-driven SOA, applications and services are treated as abstract endpoints, which can readily respond to asynchronous events. The SOA provides an abstraction away from the details of the underlying connectivity and plumbing. The implementations of the services do not need to understand protocols. Services do not need to know how messages are routed to other services. They simply receive a message from the ESB as an event, and process the message. Process flow in an ESB can also involve specialized integration services that perform intelligent routing of messages based on content. Because the process flow is built on top on of the distributed SOA, it is also capable of spanning highly distributed deployment topologies between services on the bus.

As stated above, the messages that flow on the ESB contain measurable metrics and states that are received through an event driven Service Oriented Architecture (SOA) Model. This information is via XML data stream messages, which can contain factory operation, system, business and performance and activity related metrics, which provide a relative point of origin for low level measurement. The messages can be used in analytics of the factory's overall health, which is audited and monitored, and can be used as a basis for continual process improvement strategic analysis and planning. Upon update, the data stream is analyzed and the aggregated Key Performance Indicators (KPIs) are calculated and sent to the dashboard display device, where the XML is applied to a style template and rendered for display.

The Health Monitoring System provides factory exception and error reporting, system monitoring, Performance Monitoring and Reporting, Proactive and Reactive Alert Notification, Message Auditing and Tracking Reporting, Daily View of Activity, and Historical Reports. Information collected includes what information (regarding the software factory metrics) was sent, to whom it was sent, when it was sent, and how many messages were sent via the ESB interface between the software factory and the client's system.

Figure 11:
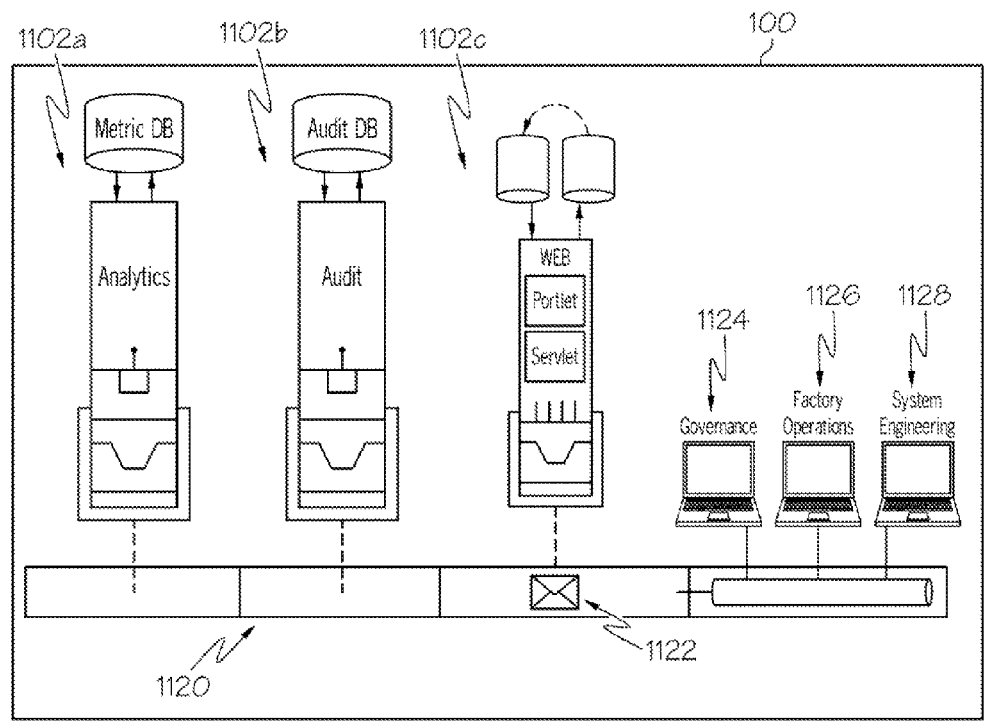
FIG. 11 shows an environment in which software factory analytics and dashboards are implemented
Figure 11:
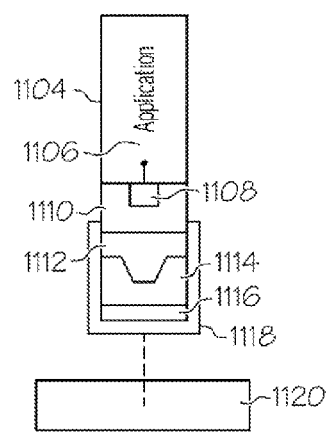

Information in the messages includes timestamps for the sender (from the software factory), the receiver (in the analytic section), and the hub (the ESB). Derived metrics include:

What Service Requestor and Provider are Most Problematic?
Re-factoring
Redesign
Quality Analysis Improvement
Detail Review
Review of Error Strategy
What Requestor and Provider are Most Active?
Quantitative Analysis
Forecast Trends and Budgeting
Strategic Analysis and Planning
Market Analysis and Planning
How Long It Took to Process
Resource Realignment
Capacity Planning
What Requestor and Provider are Least Active?
Optimization and Re-factoring
Redesign
Realignment of Strategic and Marketing Planning
Capacity Planning Realignment
Governance—Metrics
   Compliance—reporting responsibility, procedural and policy execution,
   Continual Process Improvement
   Comparative analysis against baseline and performance objectives.
   Factory Contractual Analysis
   Financial—Profitability
   Increase Revenue
   Lower Costs
Design Center—Metrics
   Asset Type Creation Analysis per project type
   When (date/time) Work Packets Definitions are created by project
   Work Packet creation Rate
   Work Packet to Project Type Pattern Analysis
   Design Compliance (Execution Units),Asset/Artifact Reuse
   Design Solution Pattern Analysis per Work Packet Type
Asset Management—Metrics
   Asset Repository Growth Rate
   Asset Repository Mix
   Asset Reuse Rate
   Project Asset Usage Patterns
Project—Metrics
   Project Proposal Induction Attempt/Success Ratio
   Factory Project Client/Industry Analysis
   Resource Availability, Activity and Tasks Status
   Milestone Achievement Rate/Status
   Schedule Analysis
   Budget/Cost Analysis
   Risk Identification
   Issue Tracking
   Defect Tracking Resolution, Project Asset Usage Patterns
   Intelligent Forecaster
Factory Operations—Metrics
   Approved Project Pipeline
   Project Throughput Rate Analysis
   Informational Analysis
   Work Packet Distribution Analysis
   Capacity Planning (Forecast/Logistics/Availability)
   Resource Inventory Levels
   Factory Utilization Rate
   Workload Characterization
   Transactional Analysis
   Performance Analysis Distribution
   Traffic Analysis
   Equipment and facilities
   Headcount and human resources data applied to physical resources
   Worker Turnover Rate
   Labor Analysis (hours, overtime, per type of factory worker)
   Process technologies used
   Production volumes
   Factory Operation Trouble Ticket/Problem Resolution (e.g. internal factory operations (infrastructure) maintenance)
Factory Financials—Metrics
   Revenue per project
   Operational Costs per Project
      Fixed
      Variable
   Profit per Project
   Profit per Project Type
System Engineering Analysis
   System Engineering—Project Risks
   System Engineering—Software Defects
   System Engineering—Issue Tracking and Resolution
   SEAT Review Scorecards Results
      CRR—Conceptual Requirements Review
      BRR—Business Requirements Review
      SRR—System Requirements Review
      PDR—Preliminary Design Review
      CDR—Critical Design Review TRR—Test Readiness Review
PRR—Production Readiness Review
FRR—Factory Readiness Review
Quality Assurance Cause Effect Correlation Analysis
Execution Units—Metrics
  Work Packet Consumption Rate
    Start (date/time) Work Packet Execution
    Finish (date/time) Work Packet Execution
  # Cross Trained Execution Unit Workers
  Availability Rate
  Quality Rating per Worker Referring now to FIG. 11, an environment for Software Factory Analytics and Dashboard is presented in a software factory 100. Note that three exemplary service endpoints 1102a-c are depicted. Service endpoint 1102a provides analytic service for measurements taken in the software factor 100. Service endpoint 1102b provides an audit service, which determines which analytic measurements should be taken. Service endpoint 1102c provides a web service that affords analytic measurements and dashboards to be transmitted in HTML or other web-based format to a monitor. Details of a service endpoint include the application (service software) 1104, an application interface 1106, a resource adapter 1108, a managed connection 1110, a client interface 1112, an ESB endpoint 1114, an invocation and management framework 1116 (protocol stacks that can be sued for transporting messages across an ESB), and a service container 1118 (an operating system process that can be managed by the invocation and management framework 1116).

Each service endpoint 1102 is coupled to the Enterprise Service Bus (ESB) 1120, to which XML message 1122 (or similar markup language formatted messages) can flow to governance monitors 1124, factory operations monitors 1126 and/or system engineering monitors 1128, on which the messages generate dashboard progress messages.

Figure 12:
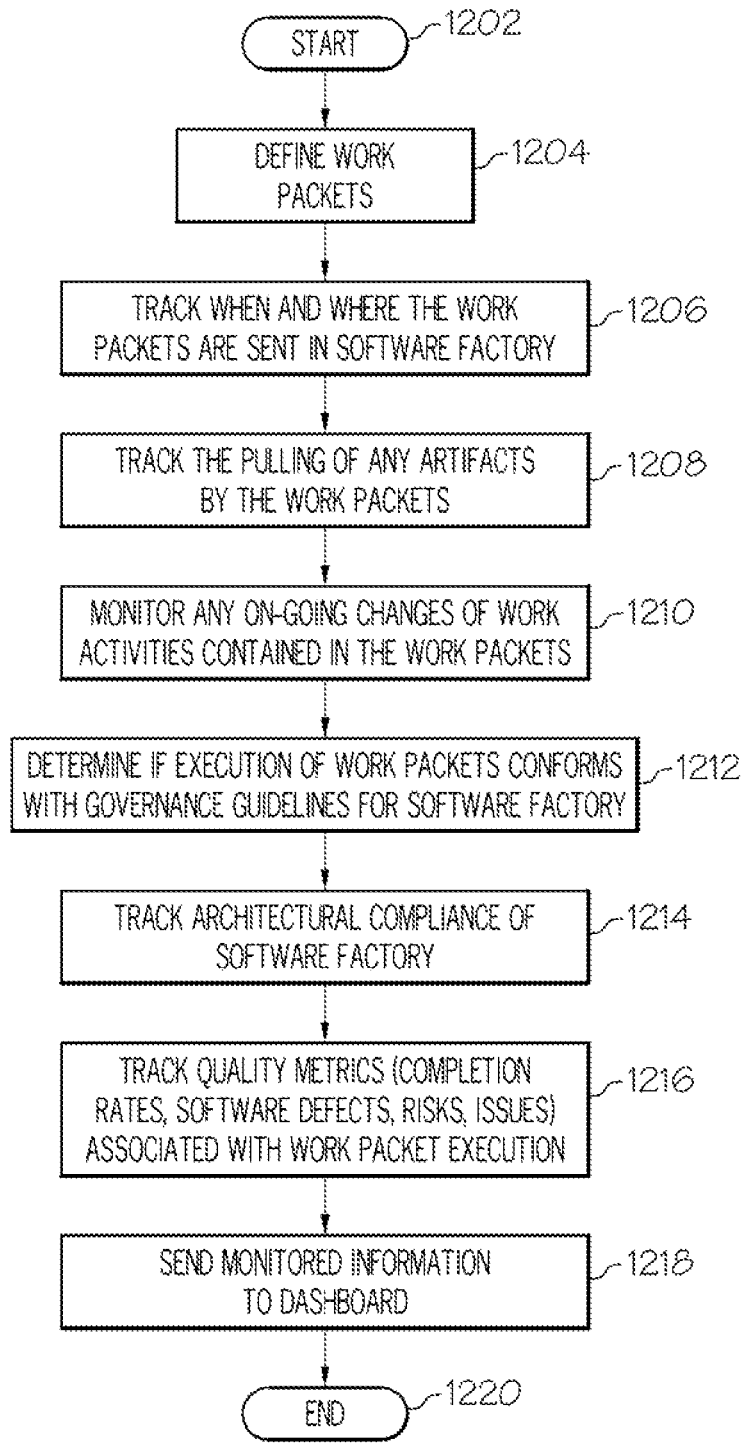
FIG. 12 is a flow-chart showing exemplary steps taken to monitor a software factory.

With reference now to FIG. 12, a flow-chart of exemplary steps taken to monitor the health of a software factory is presented. After initiator block 1202 (which may be prompted by the acceptance of a work project as described above), work packets are first defined (block 1204). As described above, these work packets are then sent to the assembly area. This transmittal is tracked (block 1206) by sending a message 1122 to the ESB 1120 shown in FIG. 11. This message 1122 contains information about where and when the work packet was sent to the assembly line. If the work packet pulls an artifact (such as artifacts 404 described in FIG. 4), another message is sent to the ESB for tracking purposes (block 1208). Similarly, messages are sent to the ESB if there are any on-going changes of work activities contained in the work packets (block 1210). Execution of the work packets is monitored to ensure that such execution conforms with governance guidelines that have been previously set for the software factory (block 1212). Similarly, the software factory is monitored to ensure that work packets comply with the architecture of the software factory (block 1214).

Quality metrics are also monitored for the execution of the work packets in the assembly line area (block 1216). That is, as different work packets are executed, assembled and tested in the assembly line area, the quality of such operations is tracked. These metrics include, but are not limited to, those described above, plus completion rates, detection of software defects, hazards (risks) caused by the execution of the work packets and other issues. This information (and optionally any other information monitored and tracked in block 1206 to 1214) is sent on the ESB to a dashboard in a monitoring display, as described in FIG. 11 above.

Figure 13:
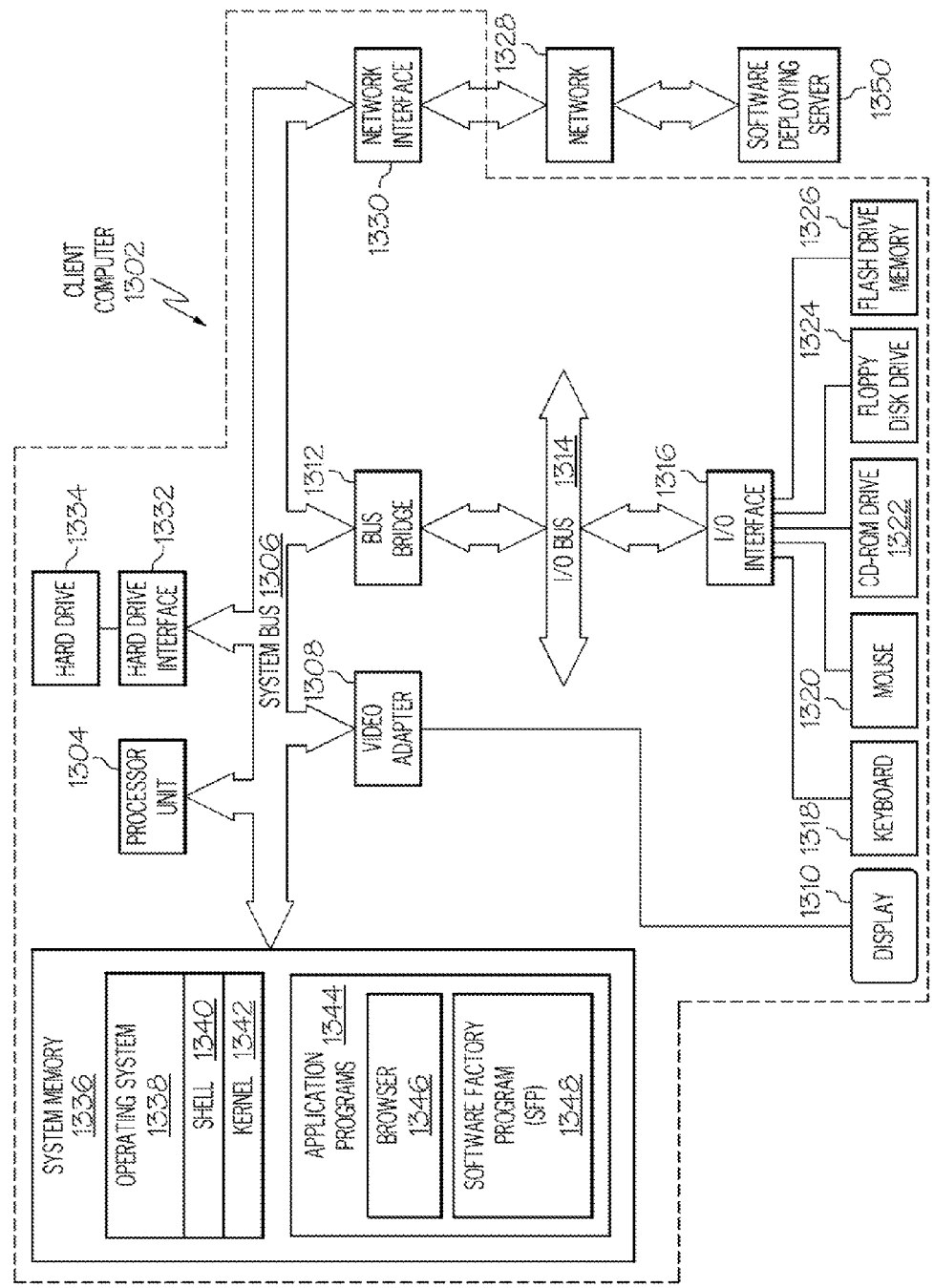
FIG. 13 illustrates an exemplary computer in which the present invention may be utilized.

With reference now to FIG. 13, there is depicted a block diagram of an exemplary client computer 1302, in which the present invention may be utilized. Note that some or all of the exemplary architecture shown for client computer 1302 may be utilized by software deploying server 1350, as well as monitors 1124, 1126 and 1128 shown in FIG. 11.

Client computer 1302 includes a processor unit 1304 that is coupled to a system bus 1306. A video adapter 1308, which drives/supports a display 1310, is also coupled to system bus 1306. System bus 1306 is coupled via a bus bridge 1312 to an Input/Output (I/O) bus 1314. An I/O interface 1316 is coupled to I/O bus 1314. I/O interface 1316 affords communication with various I/O devices, including a keyboard 1318, a mouse 1320, a Compact Disk-Read Only Memory (CD-ROM) drive 1322, a floppy disk drive 1324, and a flash drive memory 1326. The format of the ports connected to I/O interface 1316 may be any known to those skilled in the art of computer architecture, including but not limited to Universal Serial Bus (USB) ports.

Client computer 1302 is able to communicate with a software deploying server 1350 via a network 1328 using a network interface 1330, which is coupled to system bus 1306. Network interface 1330 may include an Enterprise Service Bus (not shown), such as ESB 1120 shown in FIG. 11. Network 1328 may be an external network such as the Internet, or an internal network such as an Ethernet or a Virtual Private Network (VPN). Note the software deploying server 1350 may utilize a same or substantially similar architecture as client computer 1302.

A hard drive interface 1332 is also coupled to system bus 1306. Hard drive interface 1332 interfaces with a hard drive 1334. In a preferred embodiment, hard drive 1334 populates a system memory 1336, which is also coupled to system bus 1306. System memory is defined as a lowest level of volatile memory in client computer 1302. This volatile memory includes additional higher levels of volatile memory (not shown), including, but not limited to, cache memory, registers and buffers. Data that populates system memory 1336 includes client computer 1302's operating system (OS) 1338 and application programs 1344.

OS 1338 includes a shell 1340, for providing transparent user access to resources such as application programs 1344. Generally, shell 1340 is a program that provides an interpreter and an interface between the user and the operating system. More specifically, shell 1340 executes commands that are entered into a command line user interface or from a file. Thus, shell 1340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 1342) for processing. Note that while shell 1340 is a text-based, line-oriented user interface, the present invention will equally well support other user interface modes, such as graphical, voice, gestural, etc.

As depicted, OS 1338 also includes kernel 1342, which includes lower levels of functionality for OS 1338, including providing essential services required by other parts of OS 1338 and application programs 1344, including memory management, process and task management, disk management, and mouse and keyboard management.

Application programs 1344 include a browser 1346. Browser 1346 includes program modules and instructions enabling a World Wide Web (WWW) client (i.e., client computer 1302) to send and receive network messages to the Internet using HyperText Transfer Protocol (HTTP) messaging, thus enabling communication with software deploying server 1350.

Application programs 1344 in client computer 1302's system memory (as well as software deploying server 1350's system memory) also include a Software Factory Program (SFP) 1348. SFP 1348 includes code for implementing the processes described in FIGS. 1-12 and 14a-15b. In one embodiment, client computer 1302 is able to download SFP 1348 from software deploying server 1350.

The hardware elements depicted in client computer 1302 are not intended to be exhaustive, but rather are representative to highlight essential components required by the present invention. For instance, client computer 1302 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 1350 performs all of the functions associated with the present invention (including execution of SFP 1348), thus freeing client computer 1302 from having to use its own internal computing resources to execute SFP 1348.

It should be understood that at least some aspects of the present invention may alternatively be implemented in a computer-readable medium or device that contains a program product. Programs defining functions of the present invention can be delivered to a data storage system or a computer system via a variety of tangible signal-bearing media, which include, without limitation, non-writable storage media (e.g., CD-ROM), writable storage media/device (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of SFP 1348, are performed by service provider server 1350. Alternatively, SFP 1348 and the method described herein, and in particular as shown and described in FIGS. 1-12, can be deployed as a process software from service provider server 1350 to client computer 1302. Still more particularly, process software for the method so described may be deployed to service provider server 1350 by another service provider server (not shown).

Figure 14A:
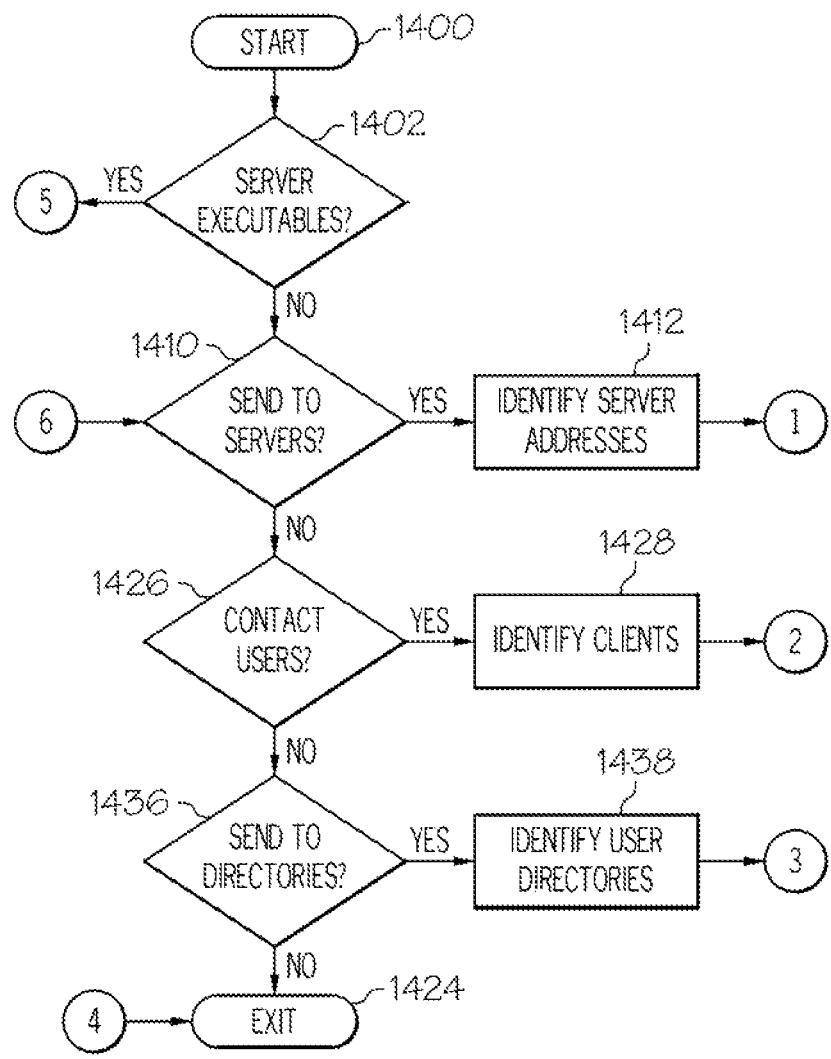
FIGS. 14A-B are flow-charts showing steps taken to deploy software capable of executing the steps described in FIGS. 1-12.
Figure 14B:
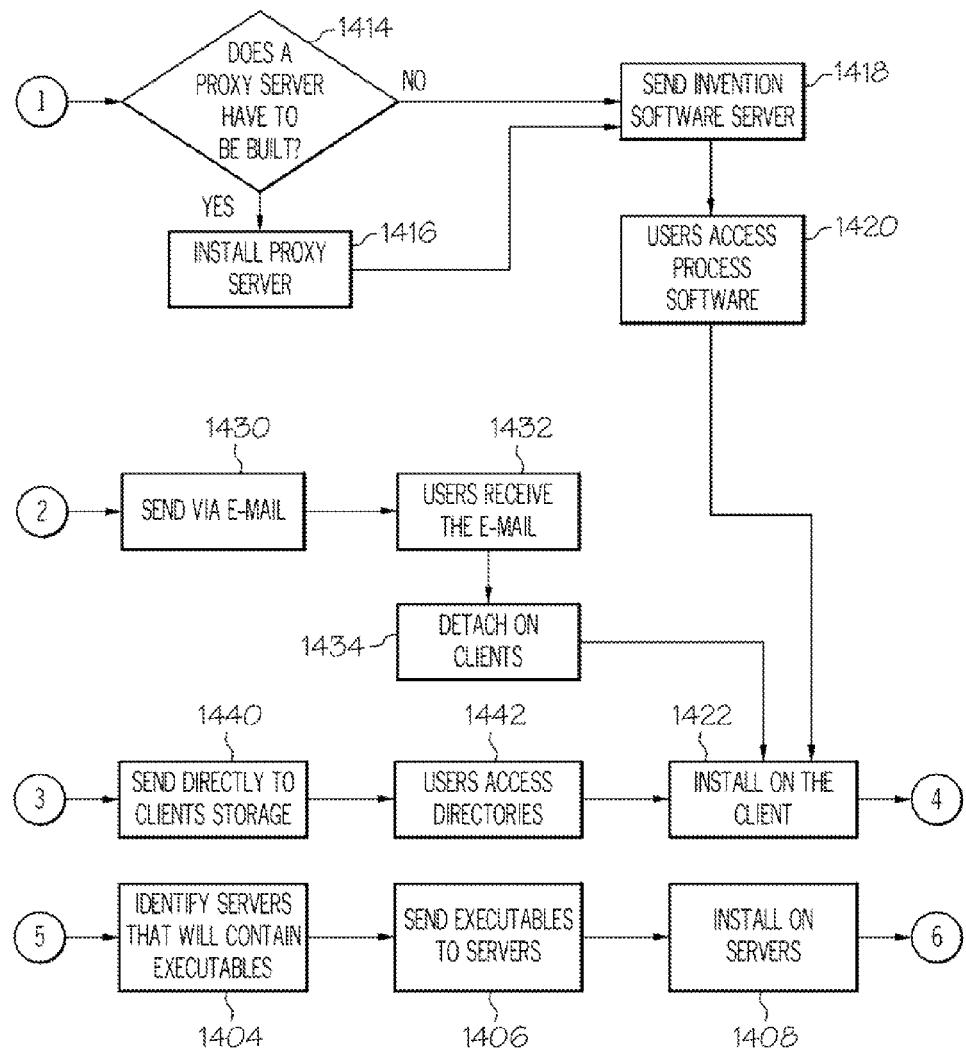

Referring then to FIGS. 14A-B, step 1400 begins the deployment of the process software. The first thing is to determine if there are any programs that will reside on a server or servers when the process software is executed (query block 1402). If this is the case, then the servers that will contain the executables are identified (block 1404). The process software for the server or servers is transferred directly to the servers' storage via File Transfer Protocol (FTP) or some other protocol or by copying though the use of a shared file system (block 1406). The process software is then installed on the servers (block 1408).

Next, a determination is made on whether the process software is to be deployed by having users access the process software on a server or servers (query block 1410). If the users are to access the process software on servers, then the server addresses that will store the process software are identified (block 1412).

A determination is made if a proxy server is to be built (query block 1414) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 1416). The process software is sent to the servers either via a protocol such as FTP or it is copied directly from the source files to the server files via file sharing (block 1418). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 1420). Another embodiment is to have the servers automatically copy the process software to each client and then run the installation program for the process software at each client computer. The user executes the program that installs the process software on his client computer (block 1422) then exits the process (terminator block 1424).

In query step 1426, a determination is made whether the process software is to be deployed by sending the process software to users via e-mail. The set of users where the process software will be deployed are identified together with the addresses of the user client computers (block 1428). The process software is sent via e-mail to each of the users' client computers (block 1430). The users then receive the e-mail (block 1432) and then detach the process software from the e-mail to a directory on their client computers (block 1434). The user executes the program that installs the process software on his client computer (block 1422) then exits the process (terminator block 1424).

Lastly a determination is made as to whether the process software will be sent directly to user directories on their client computers (query block 1436). If so, the user directories are identified (block 1438). The process software is transferred directly to the user's client computer directory (block 1440). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 1442). The user executes the program that installs the process software on his client computer (block 1422) and then exits the process (terminator block 1424).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, then additional network bandwidth, memory utilization, and storage, etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 15A:
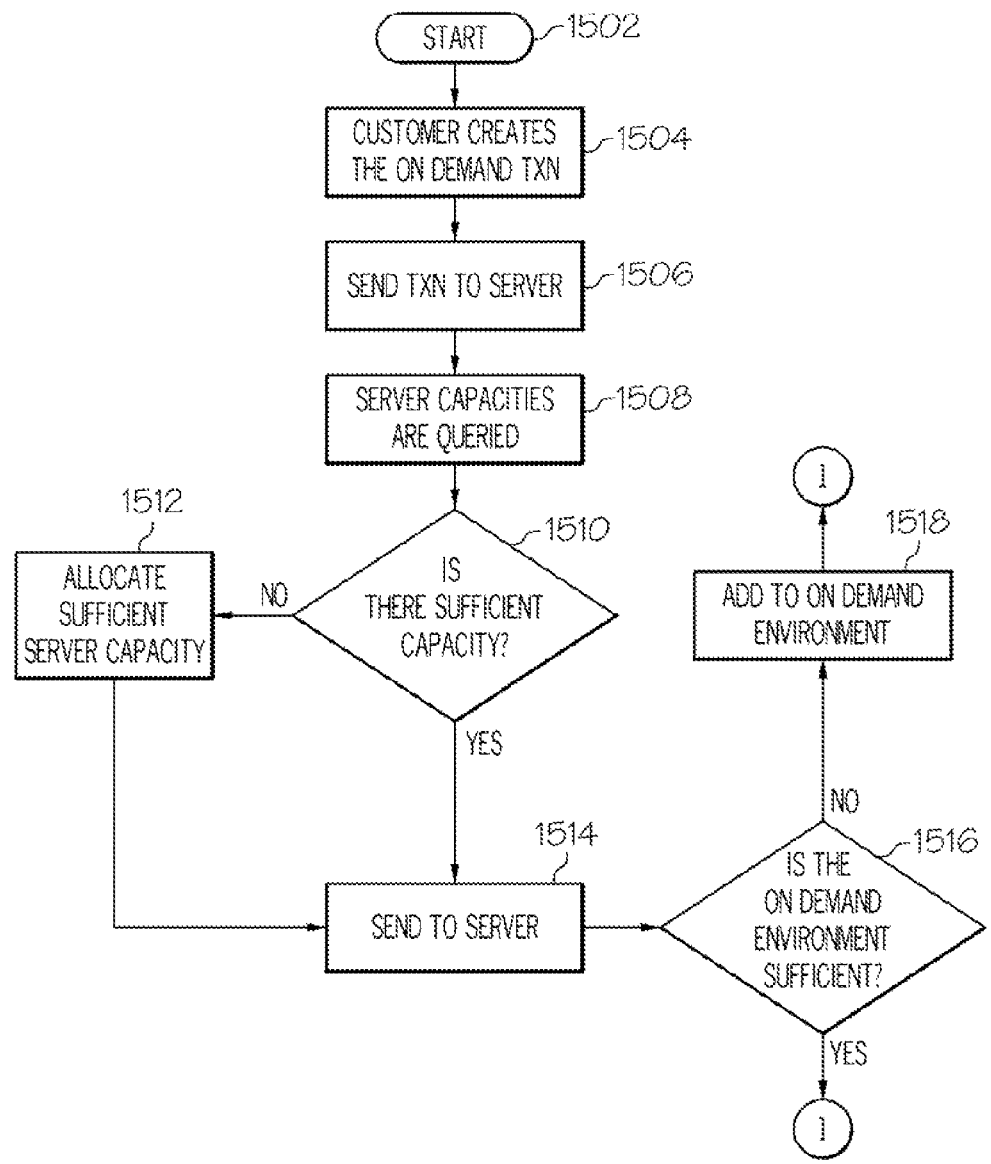
FIGS. 15A-B are flow-charts showing steps taken to execute the steps shown in FIGS. 1-12 using an on-demand service provider.
Figure 15B:
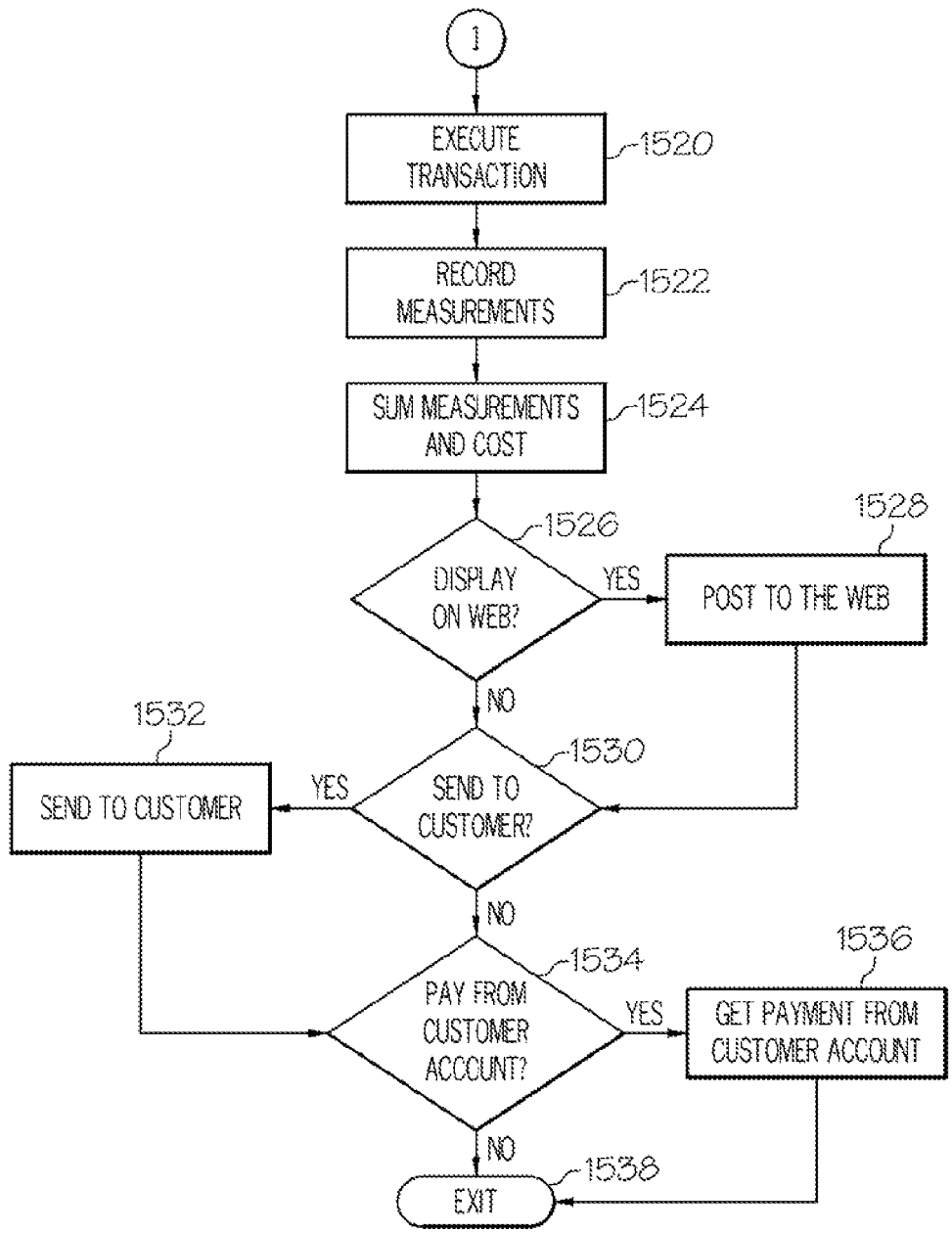

With reference now to FIGS. 15a-b, initiator block 1502 begins the On Demand process. A transaction is created than contains the unique customer identification, the requested service type and any service parameters that further, specify the type of service (block 1504). The transaction is then sent to the main server (block 1506). In an On Demand environment the main server can initially be the only server, then as capacity is consumed other servers are added to the On Demand environment.

The server central processing unit (CPU) capacities in the On Demand environment are queried (block 1508). The CPU requirement of the transaction is estimated, then the server's available CPU capacity in the On Demand environment are compared to the transaction CPU requirement to see if there is sufficient CPU available capacity in any server to process the transaction (query block 1510). If there is not sufficient server CPU available capacity, then additional server CPU capacity is allocated to process the transaction (block 1512). If there was already sufficient available CPU capacity then the transaction is sent to a selected server (block 1514).

Before executing the transaction, a check is made of the remaining On Demand environment to determine if the environment has sufficient available capacity for processing the transaction. This environment capacity consists of such things as but not limited to network bandwidth, processor memory, storage etc. (block 1516). If there is not sufficient available capacity, then capacity will be added to the On Demand environment (block 1518). Next the required software to process the transaction is accessed, loaded into memory, then the transaction is executed (block 1520).

The usage measurements are recorded (block 1522). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1524).

If the customer has requested that the On Demand costs be posted to a web site (query block 1526), then they are posted (block 1528). If the customer has requested that the On Demand costs be sent via e-mail to a customer address (query block 1530), then these costs are sent to the customer (block 1532). If the customer has requested that the On Demand costs be paid directly from a customer account (query block 1534), then payment is received directly from the customer account (block 1536). The On Demand process is then exited at terminator block 1538.

As described herein, the present invention provides a computer-implemented method, system, and computer-readable medium for maintaining a health of a software factory that creates custom software in a standardized manner. In a preferred embodiment, the computer-implemented method includes the steps of: defining work packets to perform sub-functions of a custom software, wherein the work packet is a pre-stored, reusable, self-contained, discrete unit of software code; tracking a transmission of the work packets to an assembly line in a software factory; monitoring any retrieval of software artifacts that are used to create the work packets; monitoring any on-going changes of work activities that are contained in the work packets; determining if execution of the work packets conforms to governance guidelines for the software factory; monitoring the software factory to ensure that the work packets comply with an architecture of the software factory; tracking quality metrics for an execution of the work packets in an assembly line in the software factory; and transmitting all tracked and monitored information described above to a dashboard in a monitoring display to depict a real-time health condition of the software factory. Preferably, these steps are performed in a software factory, which includes the components of a software factory governance section that evaluates the project proposal for acceptance by the software factory; a design center composed of a requirements analysis team and an architecture team, wherein the design center sections the project proposal into major functional areas that are to be handled by the requirements analysis team and the architecture team, and wherein the design center creates the work packets; and an assembly line that receives and executes the work packets to create the deliverable custom software.

In one embodiment, the design center includes: a requirements analysis team, wherein the requirements analysis team is responsible for determining system requirements for executing the deliverable custom software on the customer's system; and an architectural team, wherein the architectural team models the project proposal in accordance with customer constraints, and wherein the architectural team bundles the customer constraints together with the work packets for execution in the assembly line.

In one embodiment, the work packets include governance procedures, standards, reused assets, work packet instructions, integration strategy, schedules, exit criteria and artifact checklist templates for Input/Output routines.

The assembly line in the software factory may include software that automatically recognizes a project type for the project proposal, and wherein the assembly line assembles the work packets into the deliverable custom software in accordance with the project type that is recognized by the assembly line. In a preferred embodiment, the assembly line conducts an integration test, a system test, a system integration test and a performance test of the deliverable custom software, wherein the integration test tests the deliverable custom software for compatibility with the client's system, the system test checks the client's system to ensure that the client's system is operating properly, the system integration test tests for bugs that may arise when the deliverable custom software is integrated into the client's system, and the performance test tests the deliverable custom software for defects as it is executing in the client's system.

In one embodiment, the assembly line includes a published set of services and a published set of requirements for the assembly line, wherein the published set of services and the published set of requirements for the assembly line are published to the design center, and wherein the published set of services describes what assembly services for assembling work packets are offered by the assembly line, and wherein the published set of requirements describes what execution environment must be used by work packets that are provided by the design center for assembly in the assembly line.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method for maintaining a health of a software factory that creates software in a standardized manner, the computer-implemented method comprising:

defining work packets to perform sub-functions of a software, wherein each work packet of the work packets is a pre-stored, reusable, self-contained, discrete unit of software code;

tracking a transmission of the work packets to an assembly line in a software factory by sending a message to an enterprise service bus, wherein the message comprises information on where and when the work packets were sent in an assembly line in the software factory, and wherein the enterprise service bus couples a plurality of endpoint processes with one or more dashboards in one or more monitoring displays;

determining if execution of the work packets conforms to governance guidelines for the software factory;

monitoring the software factory to ensure that the work packets comply with an architecture of the software factory;

tracking quality metrics of the work packets as the work packets are assembled, executed, and tested in the assembly line; and transmitting, via the enterprise service bus, all tracked and monitored information to a dashboard in a monitoring display to depict a real-time health condition of the software factory.

2. The computer-implemented method of claim 1, further comprising:

monitoring any retrieval of software artifacts that are used to create the work packets;

monitoring any on-going changes of work activities that are contained in the work packets; and transmitting, via the enterprise service bus, the retrieval of software artifacts and the on-going changes to work activities to the dashboard in a web-based format.

3. The computer-implemented method of claim 1, wherein the work packets include governance procedures, standards, reused assets, work packet instructions, integration strategy, schedules, exit criteria, and artifact checklist templates for Input/Output routines.

4. The computer-implemented method of claim 1, wherein the software factory comprises:

a software factory governance section that evaluates the project proposal for acceptance by the software factory;

a design center composed of a requirements analysis team and an architecture team, wherein the design center sections the project proposal into major functional areas that are to be handled by the requirements analysis team and the architecture team, and wherein the design center creates the work packets; and an assembly line that receives and executes the work packets to create the deliverable software.

5. The computer-implemented method of claim 4, wherein the assembly line further comprises:

a published set of services and a published set of requirements for the assembly line, wherein the published set of services and the published set of requirements for the assembly line are published to the design center, wherein the published set of services describes what assembly services for assembling work packets are offered by the assembly line, and wherein the published set of requirements describes what execution environment must be used by work packets that are provided by the design center for assembly in the assembly line.

6. The computer-implemented method of claim 4, wherein the assembly line includes software that automatically recognizes a project type for the project proposal, and wherein the assembly line assembles the work packets into the deliverable software in accordance with the project type that is recognized by the assembly line.

7. The computer-implemented method of claim 4, wherein the assembly line conducts an integration test, a system test, a system integration test, and a performance test of the deliverable software, wherein the integration test tests the deliverable software for compatibility with a client's system, the system test checks the client's system to ensure that the client's system is operating properly, the system integration test tests for bugs that may arise when the deliverable software is integrated into the client's system, and the performance test tests the deliverable software for defects as it is executing in the client's system.

8. A system comprising:

a processor;

a data bus coupled to the processor;

a memory coupled to the data bus: and a computer-usable storage device embodying computer program code, the computer program code comprising instructions executable by the processor and configured for maintaining a health of a software factory that creates software in a standardized manner by configuring the system to:

define work packets to perform sub-functions of a software, wherein each work packet of the work packets is a pre-stored, reusable, self-contained, discrete unit of software code;

track a transmission of the work packets to an assembly line in a software factory by sending a message to an enterprise service bus, wherein the message comprises information on where and when the work packets were sent in an assembly line in the software factory, and wherein the enterprise service bus couples a plurality of endpoint processes with one or more dashboards in one or more monitoring displays;

determine if execution of the work packets conforms to governance guidelines for the software factory;

monitor the software factory to ensure that the work packets comply with an architecture of the software factory;

track quality metrics of the work packets as the work packets are assembled, executed, and tested in the assembly line; and transmit, via the enterprise service bus, all tracked and monitored information to a dashboard in a monitoring display to depict a real-time health condition of the software factory.

9. The system of claim 8, wherein the code also configures the system to:

monitor any retrieval of software artifacts that are used to create the work packets;

monitor any on-going changes of work activities that are contained in the work packets; and transmit, via the enterprise service bus, the retrieval of software artifacts and the on-going changes to work activities to the dashboard in a web-based format.

10. The system of claim 8, wherein the work packets include governance procedures, standards, reused assets, work packet instructions, integration strategy, schedules, exit criteria, and artifact checklist templates for Input/Output routines.

11. The system of claim 8, wherein the instructions further comprise executable instructions for supporting a software factory that comprises:

a software factory governance section that evaluates the project proposal for acceptance by the software factory;

a design center composed of a requirements analysis team and an architecture team, wherein the design center sections the project proposal into major functional areas that are to be handled by the requirements analysis team and the architecture team, and wherein the design center creates the work packets; and an assembly line that receives and executes the work packets to create the deliverable software.

12. The system of claim 11, wherein the design center further comprises:

a requirements analysis team, wherein the requirements analysis team is responsible for determining system requirements for executing the deliverable software on a customer's system; and an architectural team, wherein the architectural team models the project proposal in accordance with customer constraints, and wherein the architectural team bundles the customer constraints together with the work packets for execution in the assembly line.

13. The system of claim 11, wherein the assembly line includes software that automatically recognizes a project type for the project proposal, and wherein the assembly line assembles the work packets into the deliverable software in accordance with the project type that is recognized by the assembly line.

14. The system of claim 11, wherein the assembly line conducts an integration test, a system test, a system integration test, and a performance test of the deliverable software, wherein the integration test tests the deliverable software for compatibility with a client's system, the system test checks the client's system to ensure that the client's system is operating properly, the system integration test tests for bugs that may arise when the deliverable software is integrated into the client's system, and the performance test tests the deliverable software for detects as it is executing in the client's system.

15. A non-transitory computer-readable device encoded with a computer program, the computer program comprising computer executable instructions configured for:

defining work packets to perform sub-functions of a software, wherein each work packet of the work packets is a pre-stored, reusable, self-contained, discrete unit of software code;

tracking a transmission of the work packets to an assembly line in a software factory by sending a message to an enterprise service bus, wherein the message comprises information on where and when the work packets were sent in an assembly line in the software factory, and wherein the enterprise service bus couples a plurality of endpoint processes with one or more dashboards in one or more monitoring displays;

determining if execution of the work packets conforms to governance guidelines for the software factory;

monitoring the software factory to ensure that the work packets comply with an architecture of the software factory;

tracking quality metrics of the work packets as the work packets are assembled, executed, and tested in the assembly line; and transmitting, via the enterprise service bus, all tracked and monitored information described above to a dashboard in a monitoring display to depict a real-time health condition of the software factory.

16. The non-transitory computer-readable device of claim 15, wherein the computer executable instructions further comprise executable instructions for:

monitoring any retrieval of software artifacts that are used to create the work packets;

monitoring any on-going changes of work activities that are contained in the work packets; and transmitting, via the enterprise service bus, the retrieval of software artifacts and the on-going changes to work activities to the dashboard in a web-based format.

17. The non-transitory computer-readable device of claim 15, wherein the work packets include governance procedures, standards, reused assets, work packet instructions, integration strategy, schedules, exit criteria and artifact checklist templates for Input/Output routines.

18. The non-transitory computer-readable device of claim 15, wherein the computer executable instructions further comprise executable instructions for supporting a software factory that comprises:

a software factory governance section that evaluates the project proposal for acceptance by the software factory;

a design center composed of a requirements analysis team and an architecture team, wherein the design center sections the project proposal into major functional areas that are to be handled by the requirements analysis team and the architecture team, and wherein the design center creates the work packets; and an assembly line that receives and executes the work packets to create the deliverable software.

19. The non-transitory computer-readable device of claim 18, wherein the design center further comprises:

a requirements analysis team, wherein the requirements analysis team is responsible for determining system requirements for executing the deliverable software on a customer's system; and an architectural team, wherein the architectural team models the project proposal in accordance with customer constraints, and wherein the architectural team bundles the customer constraints together with the work packets for execution in the assembly line.

20. The non-transitory computer-readable device of claim 18, wherein the assembly line includes software that automatically recognizes a project type for the project proposal, and wherein the assembly line assembles the work packets into the deliverable software in accordance with the project type that is recognized by the assembly line.

21. The non-transitory computer-readable device of claim 18, wherein the assembly line conducts an integration test, a system test, a system integration test, and a performance test of the deliverable software, wherein the integration test tests the deliverable software for compatibility with a client's system, the system test checks the client's system to ensure that the client's system is operating properly, the system integration test tests for bugs that may arise when the deliverable software is integrated into the client's system, and the performance test tests the deliverable software for defects as it is executing in the client's system.

* * * * *